June 23, 1964 J. STEPHEN 3,138,325

PUNCTUATION MECHANISM

Filed Dec. 4, 1961 8 Sheets-Sheet 1

INVENTOR.
JAMES STEPHEN
BY Gordon R. Sanborn
ATTORNEY

June 23, 1964 J. STEPHEN 3,138,325

PUNCTUATION MECHANISM

Filed Dec. 4, 1961 8 Sheets-Sheet 2

INVENTOR.
JAMES STEPHEN

BY Gordon R. Sanborn

ATTORNEY

June 23, 1964 J. STEPHEN 3,138,325

PUNCTUATION MECHANISM

Filed Dec. 4, 1961 8 Sheets-Sheet 3

INVENTOR.
JAMES STEPHEN
BY Gordon R. Sanborn
ATTORNEY

June 23, 1964 J. STEPHEN 3,138,325

PUNCTUATION MECHANISM

Filed Dec. 4, 1961 8 Sheets-Sheet 4

INVENTOR.
JAMES STEPHEN
BY Gordon R. Sanborn
ATTORNEY

June 23, 1964 J. STEPHEN 3,138,325

PUNCTUATION MECHANISM

Filed Dec. 4, 1961 8 Sheets-Sheet 5

INVENTOR.
JAMES STEPHEN
BY Gordon R. Sanborn
ATTORNEY

INVENTOR.
JAMES STEPHEN
BY Gordon R. Sanborn
ATTORNEY

June 23, 1964 | J. STEPHEN | 3,138,325

PUNCTUATION MECHANISM

Filed Dec. 4, 1961 | 8 Sheets-Sheet 7

INVENTOR.
JAMES STEPHEN
BY Gordon R. Sanborn
ATTORNEY

United States Patent Office 3,138,325
Patented June 23, 1964

3,138,325
PUNCTUATION MECHANISM

James Stephen, Royal Oak, Mich., assignor to Burroughs Corporation, Detroit, Mich., a corporation of Michigan Filed Dec. 4, 1961, Ser. No. 156,796
19 Claims. (Cl. 235—60.15)

Figure 1:
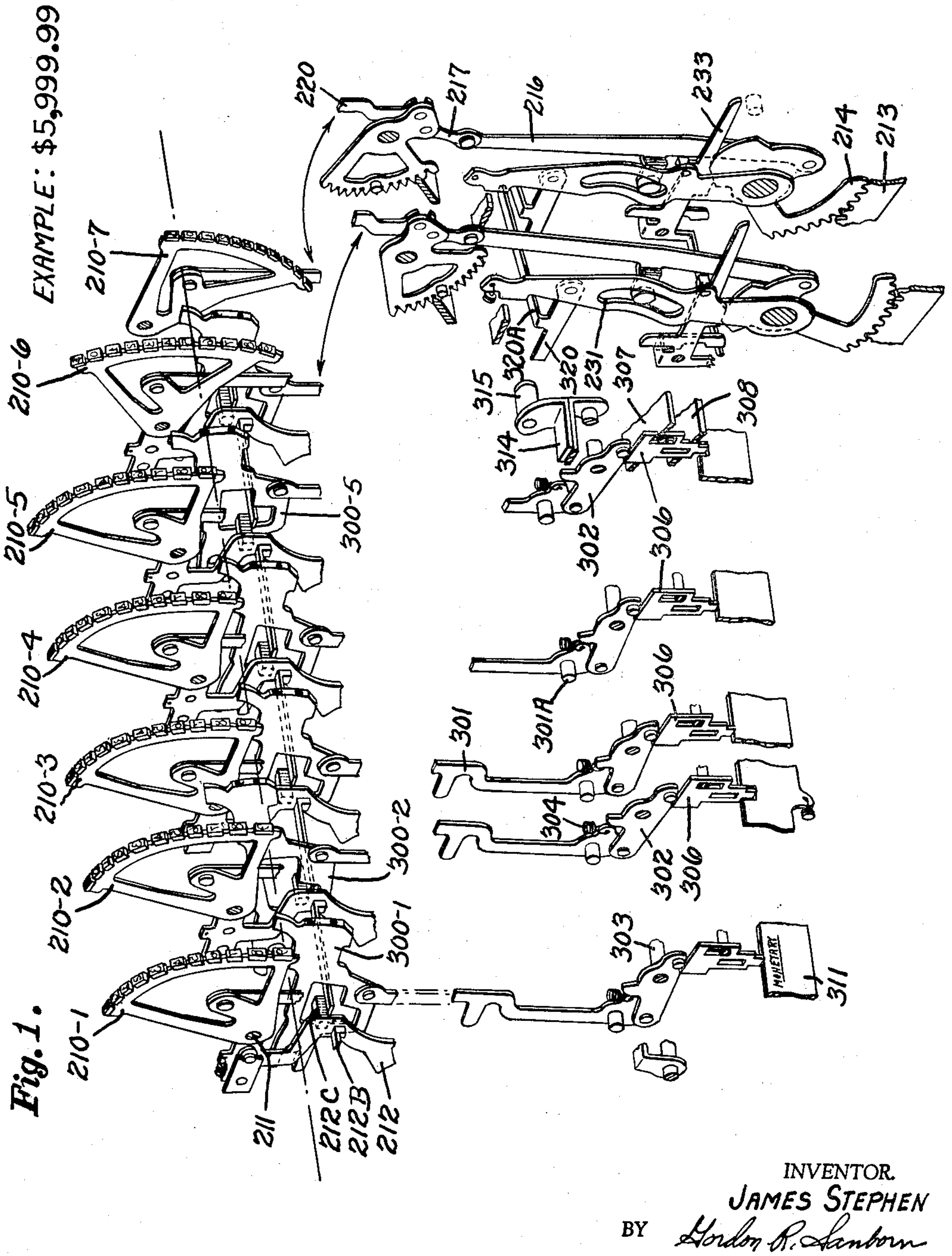

The present invention relates to calculating machines and more particularly to a punctuation locating and printing mechanism.

In calculating and accounting machines which are used only in connection with monetary amounts a decimal font is commonly positioned between the second and third orders of the digit printing sectors so that a decimal will always be printed to separate the tens from the hundreds order. In such fixed decimal machinnes there is no particular problem associated with the printing of the decimal. However in calculating machines which are used for multiplication and division of decimal amounts it is advantageous to have means for printing the decimal between each of the digit printing locations as well as means for printing monetary amounts. In such machines it is also advantageous to be able to print commas between each of the third higher order positions to the left of the decimal providing there is a digit being printed in the succeeding fourth higher orders to the left of the decimal.

One difficulty associated with providing a digit printing mechanism having an automatic punctuation printing mechanism associated therewith is that zeros to the left of the highest order nonzero digit in a number must not be printed if the number involved is greater than one. However if the number being printed is less than one but greater than zero with zeros between the decimal and the first significant digit to the right thereof, as for example ".005," the printing mechanism must be able to print the zeros to the left of the significant digit and to the right of the decimal and yet not print zeros to the left of the decimal.

Therefore it is an object of the present inventon to provide an automatic punctuation locating and printing mechanism for a business machine. A further object of the present invention is to provide an improved punctuation locating and printing mechanism for a calculating machine which can be used for printing monetary amounts as well as nonmonetary digital amounts. An additional object of the present invention is to provide a punctuation printing mechanism which will automatically print the necessary punctuation marks in monetary amounts and yet print a decimal in the proper position when a nonmonetary digital amount is printed. Another object of the present invention is to provide a punctuation printing mechanism for a calculating machine which will selectively automatically print a safeguard symbol to the left of the highest order digit being printed in a monetary amount. Another object is to provide a punctuation printing mechanism in which the decimal in each individual factor of a multiplication operation is printed in the proper position in response to the operation of a decimal key during the sequential entry of the digits making up the numbers of each factor, and in which the decimal in the resulting product is automatically located and printed in the proper position. A further object is to provide a punctuation locating and printing mechanism in which if an operator makes a mistake during the entry of a second factor the operation of an error key will only remove the erroneous factor and not necessitate the re-entry of the previously entered first factor.

These objects are achieved in accordance with the present invention through the use of a plurality of individually variably movable digit printing sectors each of which can be selectively coupled with individually variably movable punctuation printing sectors which are positioned between adjacent ones of the digit printing sectors. A plurality of control slides operable by digit keys but under the control of a decimal key serve to control the movement of the punctuation sectors from a disabled position to a selected one of a plurality of enabled positions. The printing mechnism is adapted to print the decimal between the "tens" and "hundreds" orders during the listing of monetary amounts, without the machine operator depressing or operating any punctuation controls. Power means is provided for automatically changing the printing mechanism from the "monetary" mode to the digital or "nonmonetary" mode when selected operation control keys are operated.

The mechanism includes a first control slide which has the necessary control surfaces thereon to cause the punctuation to print for monetary amounts without the need for an operator to depress a punctuation key when working with dollars and cents. This first slide is movable, however, so that if the operation being performed requires the use of fractions of a cent the operator can depress a key prior to the entry of fractions of a cent and therefore cause the proper monetary printing. Second and third punctuation control slides are so operated that the individual factors of a multiplication problem as well as the resulting product will have the decimal properly located therein. The slides are so controlled that if an operator correctly enters the first factor in a multiplication operation and then makes a mistake during the entry of the second factor, the operation of an error key will allow her to merely re-enter the correct second factor and yet obtain correct punctuation in the product.

The novel aspects of the invention are set forth in the claims, but additional objects and advantages of the system as well as the manner of operation of a preferred embodiment thereof will be more clearly understood from the following description when read with reference to the accompanying drawings wherein, FIG. 1 is a perspective view from the right rear corner of the printing mechanism with the parts spread and illustrating the parts in the proper positions for printing "$5,999.99,"

Figure 2:
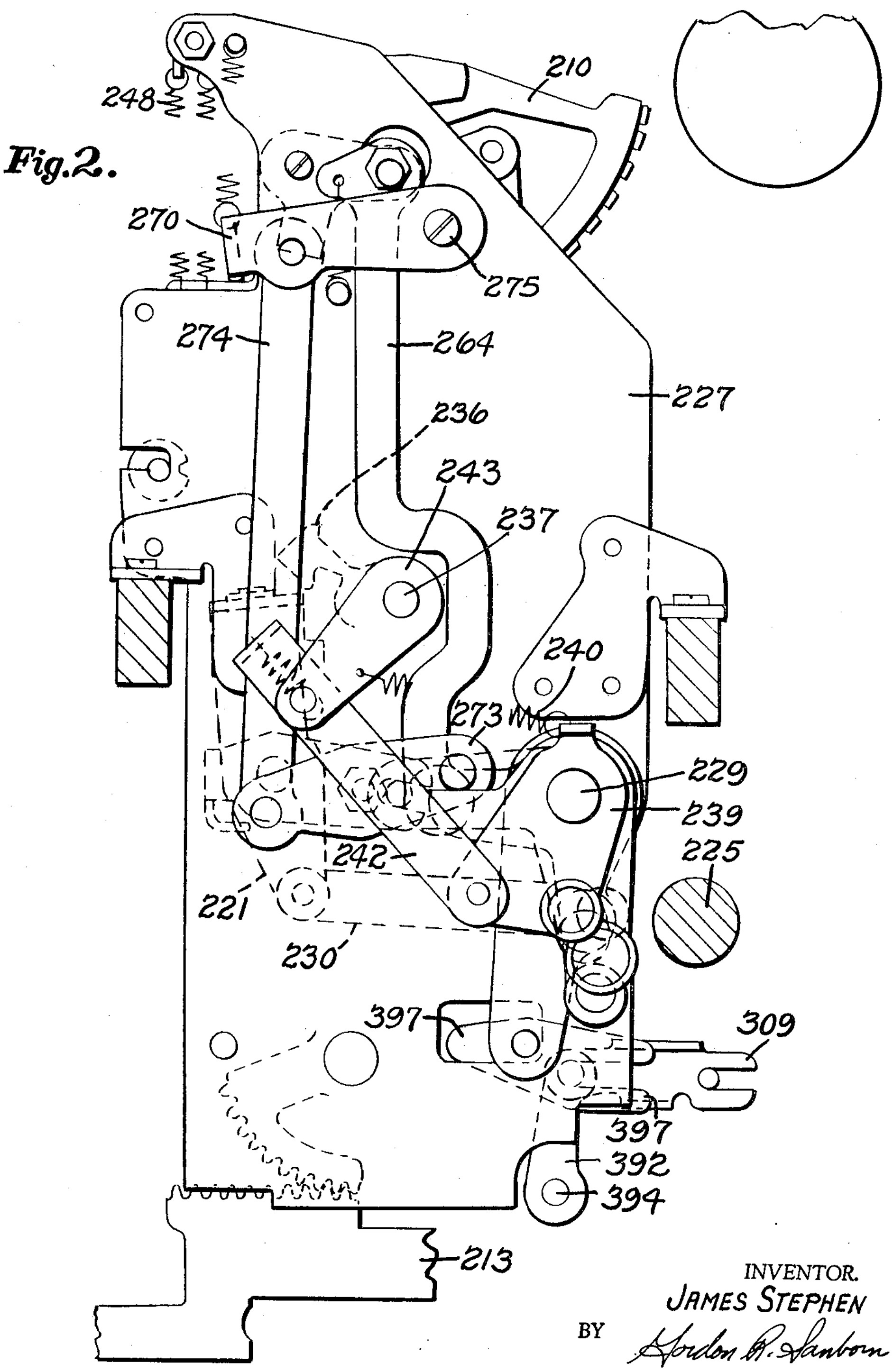
Figure 3:
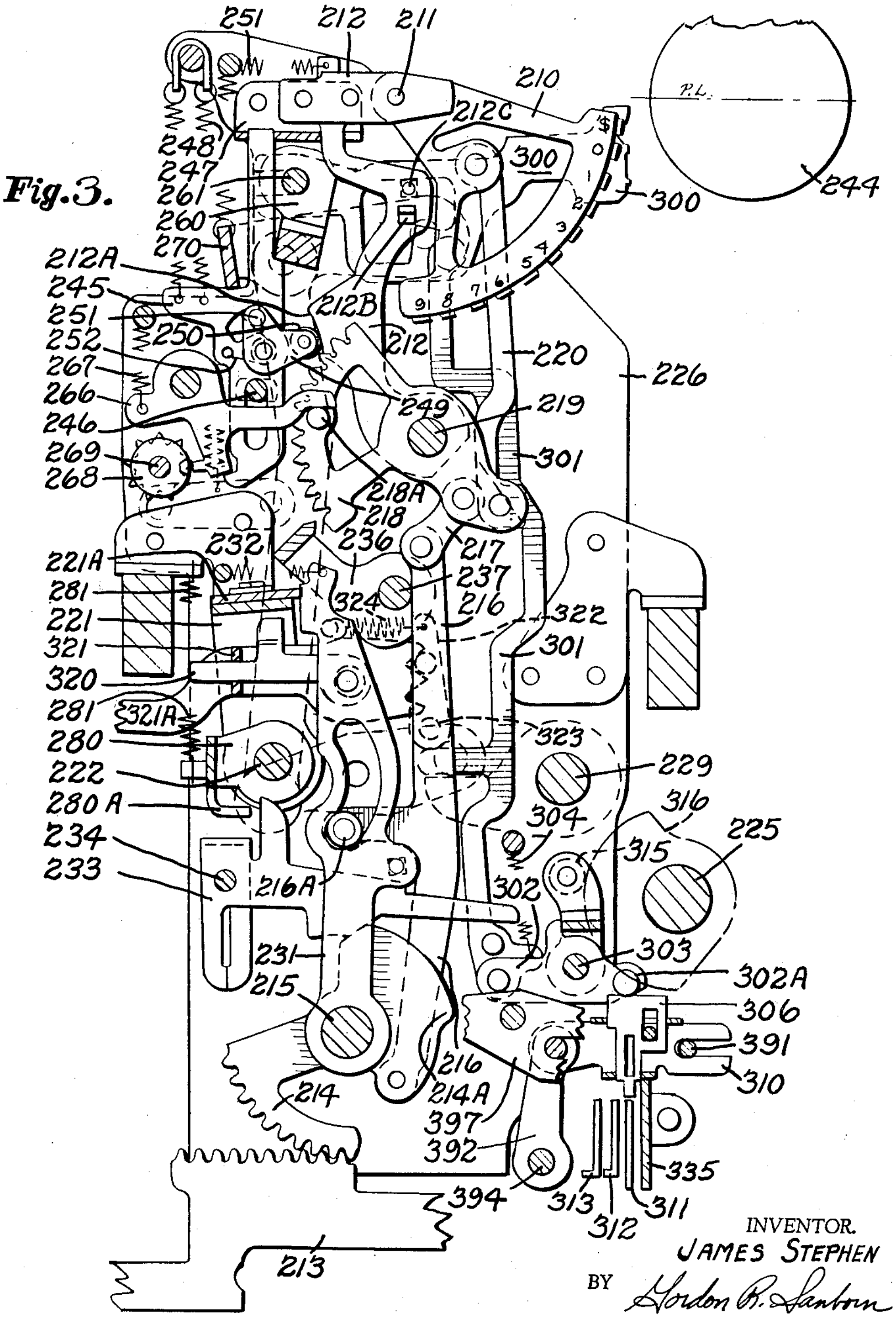
Figure 4:
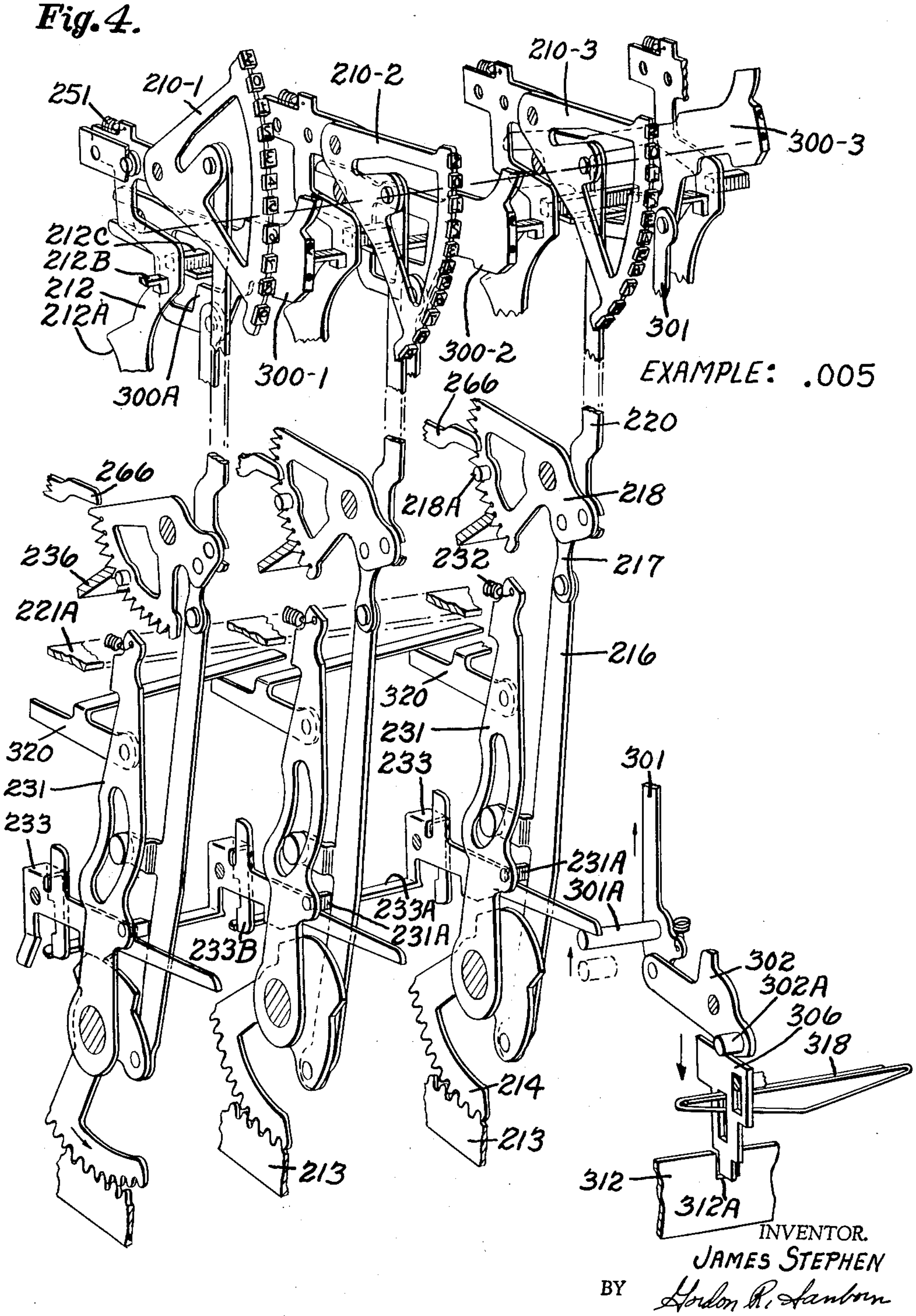
Figure 5:
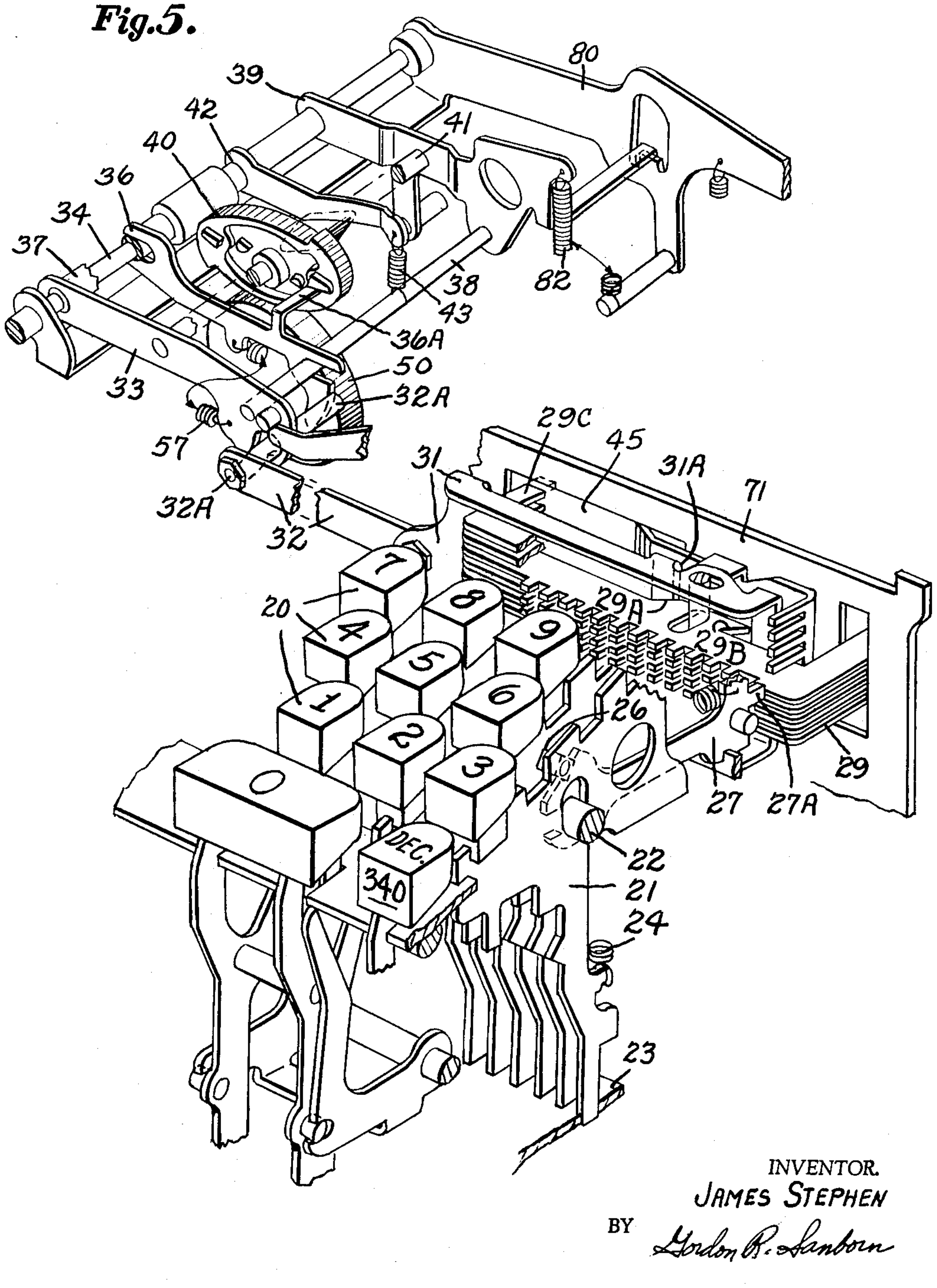
Figure 6:
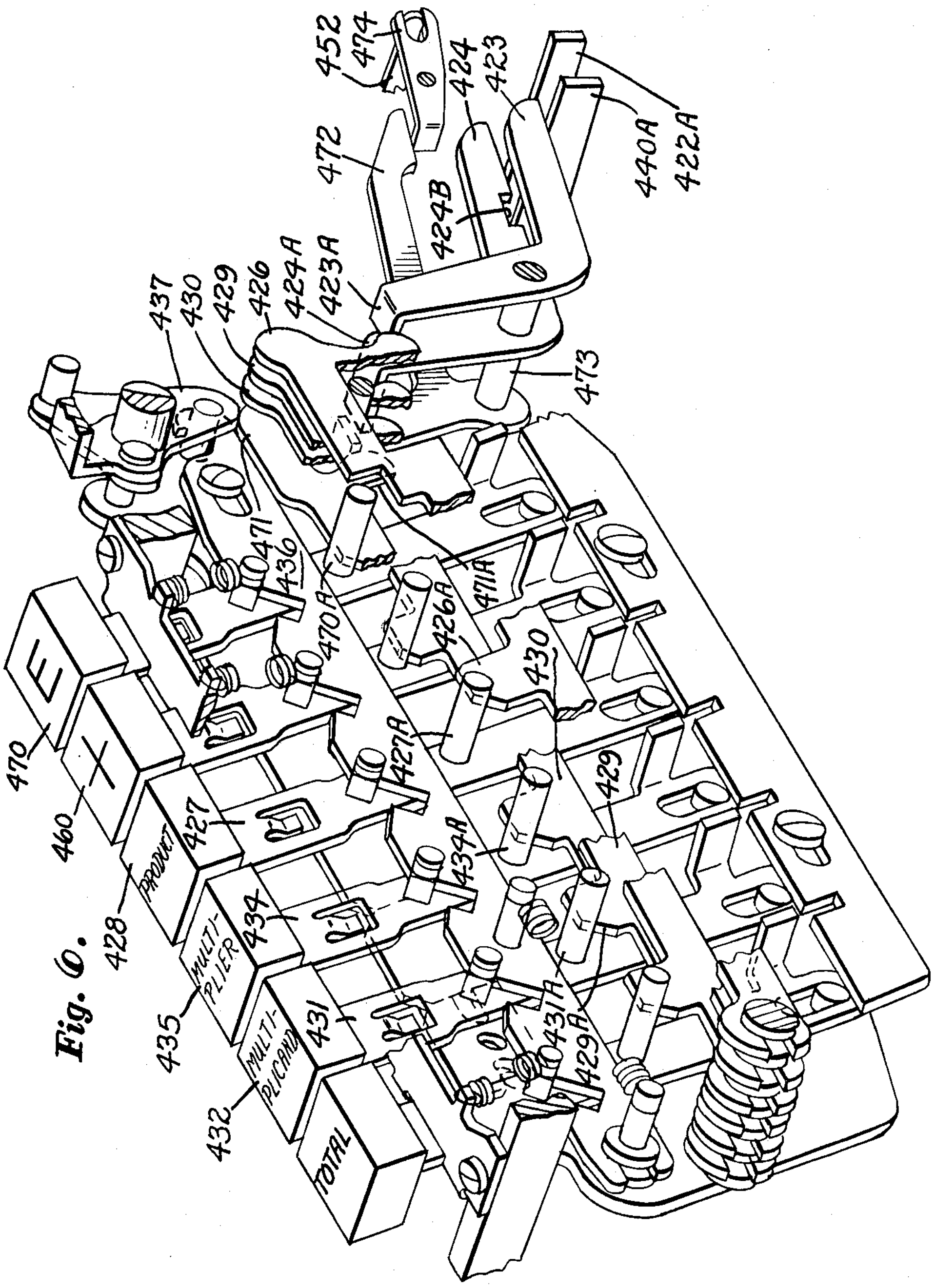
Figure 7:
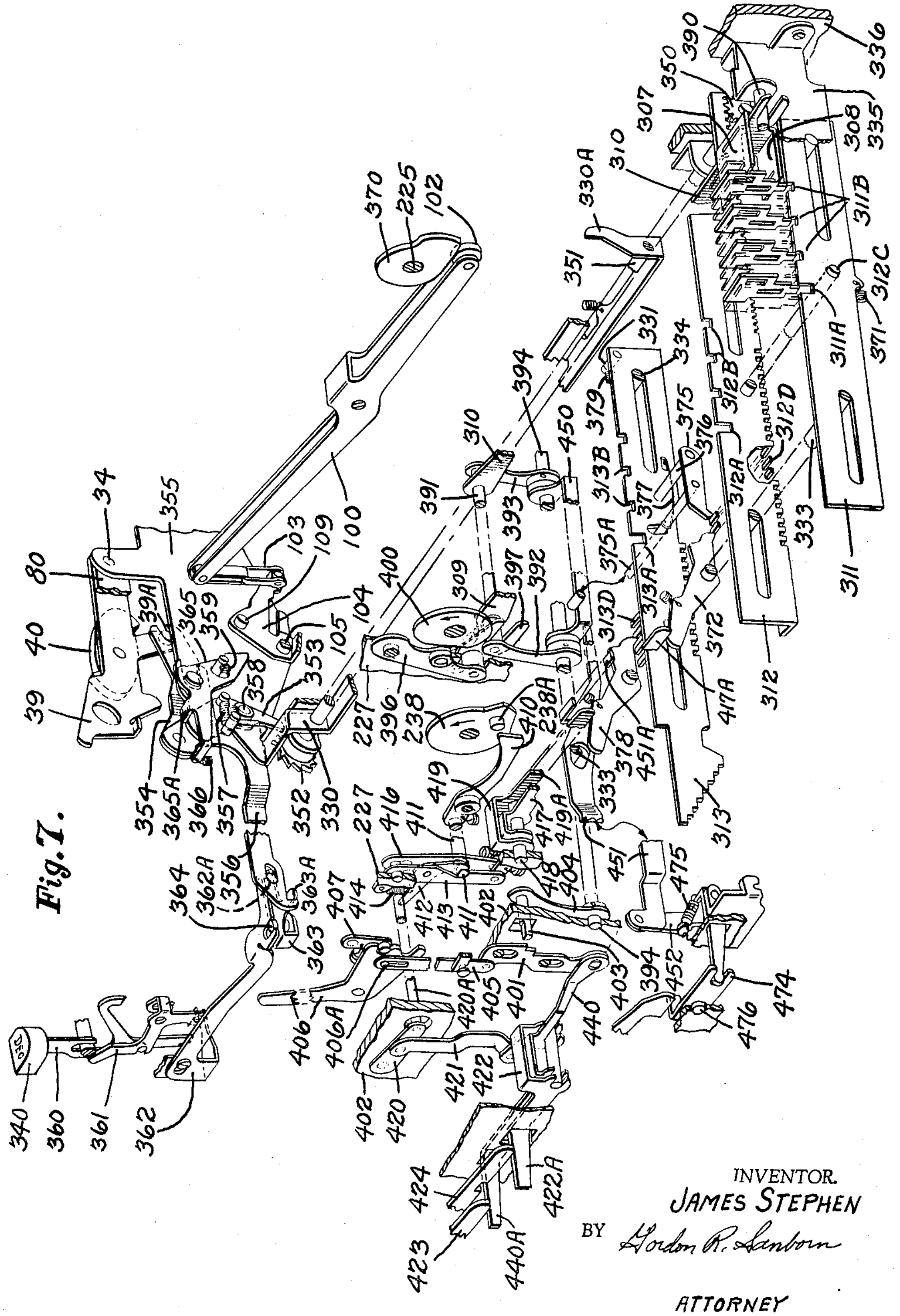
Figure 8:
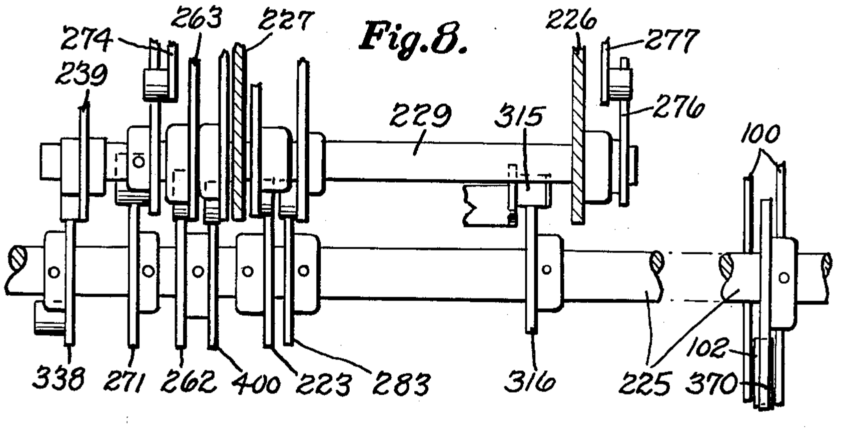
Figure 9:
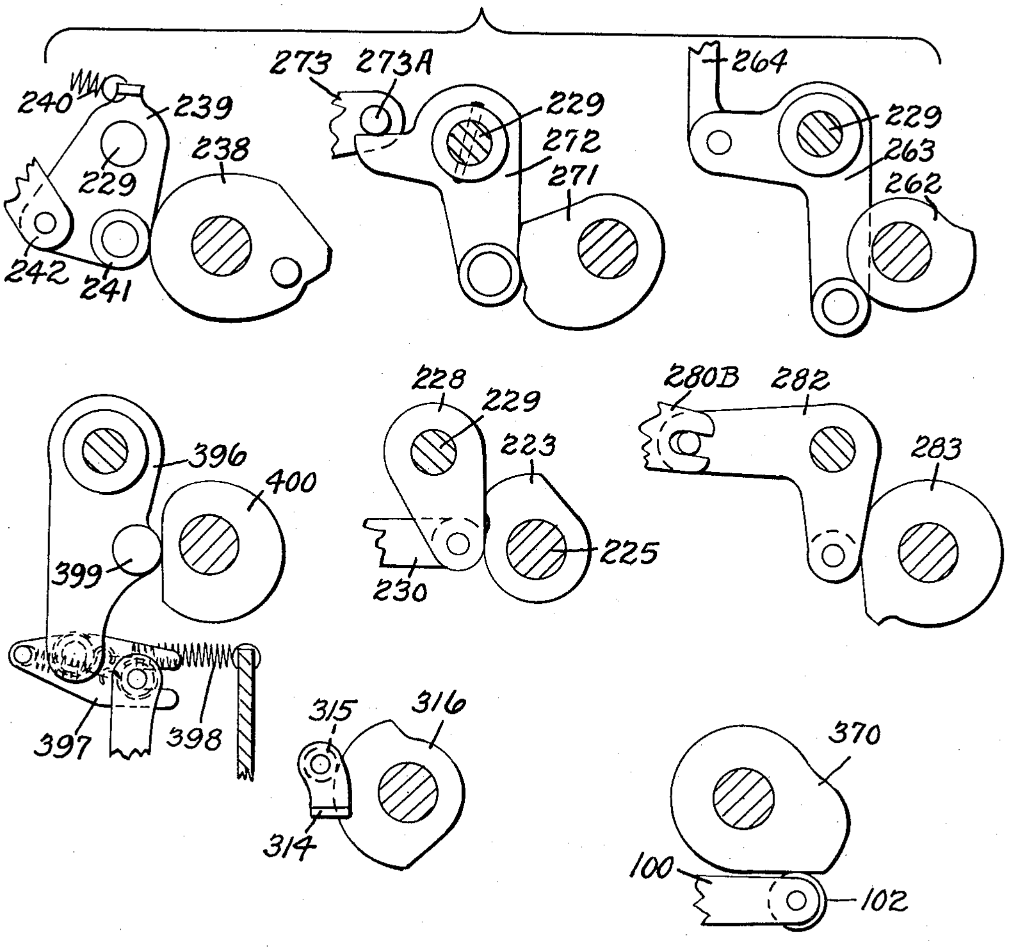

FIG. 2 is a right elevation from outside the right frame of the printing mechanism, FIG. 3 is a right elevation of the printing mechanism as seen with the right frame of FIG. 2 removed, FIG. 4 is a perspective view from the right rear corner of the printing mechanism with the parts spread and illustrating the position of the parts in three orders of the printing mechanism for printing an amount which is less than one (".005"), FIG. 5 is a perspective view from the right front corner of a machine embodying the invention and illustrating the digit keys and power mechanism associated therewith for controlling the punctuation printing mechanism, FIG. 6 is a perspective view from the right front edge of the operation control keys associated with the punctuation printing mechanism, FIG. 7 is a perspective view from the right rear corner of the machine showing the punctuation controls with the parts separated to more clearly illustrate their manner of operation, FIG. 8 is a top view of the main driveshaft and associated cams as seen from above and to the rear of the machine, and FIG. 9 is a composite right elevation of each of the cams and associated drive arms illustrated in FIG. 8.

In the following description of a preferred embodiment of the invention the terms right and rightwardly, left and leftwardly, up and down, top and bottom, front and rear, forwardly and rearwardly, and clockwise and counterclockwise will be used with reference to the parts as seen by a person viewing the mechanism when positioned in front of, on the right-hand side of, or above a machine embodying the mechanism.

Referring now to the drawings and in particular to FIG. 1 there is illustrated seven orders of the digit printing mechanism together with six of the punctuation printing devices associated therewith in the proper positions to print "$5,999.99." Each of the digit printing devices is in the form of a digit sector 210 pivoted at 211 on the upper end of individual digit sector support arms 212. Since it will facilitate the understanding of the invention by referring to the individual digit sectors of each order, each of the specific sectors will be identified by an additional digit following the number "210." For example, the units order digit sector is identified as 210–1 and the tens order sector is identified as 210–2. Each of the digit sectors is individually variably movable to a selected one of its printing positions from a normally disabled position by the mechanism illustrated in FIG. 3. Referring now to FIG. 3 it will be seen that each of the sectors 210 is under the control of an add rack 213 which is supported for rearward movement from the position of FIG. 3 in accordance with an amount being entered in that order of the machine. The add racks are positively driven rearwardly during the first half of a machine cycle and are then driven forwardly to their home positions near the end of the second half cycle by means well known in the art, as for example the add rack drive mechanism of U.S. Patent No. 2,693,906. The power for driving the add racks is provided by means of a cam secured to the main driveshaft 225. The distance which the add racks 213 move rearwardly is controlled by a conventional "pin wagon" commonly used in ten key calculating machines, or by other numerical key operated control devices which are well known in the art. In the particular embodiment of the invention illustrated herein the extent of rearward movement which add racks 213 undergo during the first half of a cycle is controlled by the digit indexing means disclosed in the copending application of Georg K. Caspari, Serial No. 127,194, which was filed on July 27, 1961 and is assigned to the present assignee. It will be seen in FIG. 3 that the upper geared surfaces of the racks 213 are engaged with the teeth on the associated arcuate sectors 214 supported by the stationary shaft 215. A driving arm 216 connected with the arcuate sector 214 is coupled by link 217 with an aligning sector 218 pivoted on the stationary shaft 219 which also supports the sector support arms 212. A connecting link 220 connects each digit sector 210 with an aligning sector 218 and therefore each sector 210 will be rotated to bring a selected digit font to the printing position in response to movement of an associated add rack 213.

It will be seen that the arm 216 together with the links 217 and 220 forms a toggle arrangement in the sense that if the arm 216 is moved clockwise with respect to the arcuate sector 214 to its FIG. 4 position prior to the time that the associated rack 213 moves rearward, the sector 210 will be rotated by an amount sufficient to bring the zero font thereon to the printing line. It should be noted that each of the digit sectors 210 carries the usual ten digit fonts as well as a safeguard symbol font ($) which is positioned above the zero font. Normally the digit sectors 210 are retained in the disabled position illustrated in FIG. 3 with the safeguard symbol font below the printing line so that a visible printing apparatus will be provided.

The means for straightening each of the toggles formed by the arms 216 and links 217 and 220 includes a bail 221 pivoted on the stationary shaft 222 and having a crossarm 221A (FIGS. 3 and 4) which is power driven in a clockwise direction by means of the cam 223 (FIG. 9) secured to the main driveshaft 225. The main driveshaft 225 is driven in a counterclockwise direction through 360° by a conventional power drive, including an electric motor, as is well known in the art. Each of the cams in FIG. 9 is shown in its respective position on shaft 225 when shaft 225 is in its home position. As seen in FIGS. 8 and 9 the cam 223 is located between the stationary frames 226 and 227 and is engaged with a roller on the left side of a lever 228 supported by the shaft 229. A connecting link 230 (FIGS. 2 and 9) secured to the lever 228 and to the downwardly extending end of the bail 221 renders the bail 221 responsive to the rotation of shaft 225. From the shape of the cam 223 in FIG. 9 it will be seen that the bail 221 will be rocked clockwise and returned counterclockwise to its home position during the early portion of the counterclockwise rotation of cam 223. Each of the arms 216 has a rightwardly extending stud 216A (FIG. 3) carrying a roller disposed within an arcuate slot of a lever 231 pivoted on the shaft 215. Individual springs 232 connected to the upper ends of the levers 231 urge the levers 231 in a counterclockwise direction against the crossarm 221A of the bail 221 and also hold the roller on lever 228 against the cam 223. When the cam 223 rocks the bail 221 clockwise each of the levers 231 will be positively driven in a clockwise direction by an amount sufficient to straighten each of the toggles and thereby elevate each of the digit sectors to its zero printing position. Thereafter the add racks 213 are moved rearwardly by differential amounts in accordance with the numerical keys which have been operated, by means well known in the art, and as a result the digit sectors 210 are rotated to their proper numerical positions. Following the positioning of the digit sectors by the add racks the cam 223 will present its low portion to the roller on lever 228 so that the springs 232 will be effective to provide a counterclockwise urge on each of the levers 231. Those levers 231 which are associated with digit sectors which are only in their zero positions will thereby be urged in a counterclockwise direction toward their FIG. 3 positions prior to the printing operation.

Each of the arcuate sectors 214 is provided with a cam surface 214A which serves to control an associated latch 233 pivoted on the small stationary shaft 234. Each of the levers 231 has a leftwardly extending rectangular stud 231A (FIG. 4) which is normally maintained above the right angled latching surface on the latch 233 associated therewith. It will be seen from FIG. 3 that when an arcuate sector 214 is moved in a counterclockwise direction the associated latch 233 will be cammed counterclockwise about the shaft 234. As previously explained the levers 231 are moved in a clockwise direction during the early portion of the rotation of the main shaft 225 prior to the time that the add racks 213 move rearwardly and therefore the rectangular studs 231A are moved rearwardly prior to the time that the latches 233 are moved counterclockwise. As seen in FIGS. 3 and 4 the rearward travel of an add rack 213 will cause the associated latch 233 to be moved to a position where it will engage a stud 231A. Therefore the lever 231 in that order will be held against the counterclockwise urge of its spring 232. Thus the counterclockwise urge on the levers 231 which occurs prior to the printing time will only be effective to return those levers 231 to their home positions which are associated with latches 233 which have not been operated. By means to be described hereinafter the latches 233 may be operated by other control means so that even those digit sectors associated with a nonmoved add rack which are to print a zero will be held in an operative position against the counterclockwise urge of the springs 232.

After the sectors 210 have been elevated to their proper numerical positions an aligning bail 236 (FIG. 3) pivoted on the shaft 237 is rocked clockwise to bring the blade thereof into mesh with the teeth of the aligning sector 218 to accurately position the digit printing sectors 210 for the printing operation. As seen in FIGS. 2, 8 and 9 the aligning bail 236 is operated by a cam 238 on the main shaft 225. A lever 239 pivoted on the shaft 229 on the right side of frame 227 is urged in a counterclockwise direction by a spring 240 to maintain a roller 241 thereon in engagement with cam 238. Link 242 (FIGS. 2 and 9) interconnects the lever 239 and a lever 243 secured to the right end of the shaft 237 to which the aligning bail 236 is secured. Thus it will be seen that the counterclockwise drive of cam 238 will be effective to rock the aligning bail into and away from engagement with the aligning sectors prior to the time that the digit sectors are driven rearwardly against the platen 244.

Each of the sector support levers 212 has an arcuate cam surface 212A which is engageable by an associated individual hammer firing mechanism. The hammer firing mechanism is shown in FIG. 3 and includes a hammer slide 245 supported by a small stationary shaft 246 and a slotted frame 247 for movement in a vertical plane. Each slide 245 is urged upwardly by a relatively strong spring 248 and each has a small lever 249 pivoted thereon. Each lever 249 carries a roller 250 which is engaged with the arcuate surface 212A on the associated sector lever 212. The slides 245 each have an opening therein through which a stud 251 on the associated lever 249 passes so that as the slide 245 moves upwardly the lever 249 cannot move in a clockwise direction. As a result thereof the upward movement of the slide 245 will cause the roller 250 to ride up the arcuate cam surface 212A of the associated sector lever 212. It will be seen from FIG. 3 that such upward movement of a slide 245 will cause the associated lever 212 and sector 210 to be accelerated rearwardly to bring a type font against the platen 244. The slide 245 moves upwardly by an amount sufficient to carry the roller 250 above the upper end of the arcuate cam surface 212A and therefore the roller 250 will lose its driving engagement with the lever 212. Each of the levers 212 and sectors 210 is urged forwardly by a light spring 251 connected to a stationary shaft and to the upper end of a lever 212. Therefore, as the sector 210 rebounds from the platen the forward urge thereon provided by the spring 251 will bring the upper end of the arcuate cam surface 212A beneath the lower edge of the associated roller 250.

Following the actual printing operation the slides 245 are power driven downwardly to their set positions. As the slides 245 move downwardly the levers 249 pivoted thereon will be rocked in a counterclockwise direction as the roller 250 engages the arcuate cam surface 212A. Each of the levers 249 is urged clockwise by a small hairspring 252 and therefore as the slide 245 moves downwardly the lever 249 will rock clockwise to its position of FIG. 3. Since the roller 250 is engaged with the arcuate cam surface 212A at the time that the slide 245 starts to move upwardly it will be seen that there is no impact between the hammer mechanism and the sector. Instead the shape of the arcuate cam surface allows the sector 210 to undergo a uniform acceleration rearwardly in response to the upward movement of the associated slide 245. Since the roller 250 loses engagement with the arcuate surface 212A prior to the time that the sector 210 rebounds from the platen no shadow print occurs.

A hammer firing control bail 260 supported by the shaft 261 normally holds each of the hammer slides 245 in its lowered position until the proper time for the printing operation. The bail 260 extends across the entire printing mechanism and is positively operated by a cam 262 (FIG. 9) which engages a roller on the lever 263 supported by shaft 229. The forwardly extending arm of the lever 263 is coupled with the hammer firing bail by means of the link 264 which as seen in FIG. 2 is positioned on the right side of the main frame 227. From the shape of the cam 262 it will be seen that as the shaft 225 moves counterclockwise the bail 260 will be moved counterclockwise at the proper time to release selected ones of the slides 245 for upward movement.

As seen in FIG. 3 each of the aligning sectors 218 has a rightwardly extending stud 218A which is disposed beneath the rearwardly extending arm of one of a plurality of hammer control levers 266. Each of the levers 266 is urged in a clockwise direction by a spring 267 to maintain the rearwardly extending end thereof in engagement with the stud 218A. The downwardly extending arm of the lever 266 is normally in the position shown in FIG. 3 where it is in the path of the forwardly extending lower end of the associated hammer slide 245. When the parts are in their home positions of FIG. 3 the hammer firing bail 260 will serve to hold each of the slides 245 in a lowered position where the lower end of the slides 245 is slightly below the downwardly extending arms of the control levers 266. When the aligning sector 218 is rocked clockwise in response to the straightening of the toggle mechanism to bring the sectors 210 to the zero position each stud 218A will release the associated lever 266 for clockwise movement to a position where the downwardly extending arm thereof will be removed from the path of travel of the lower forwardly extending end of the associated slide 245.

Each of the levers 266 has on the downwardly extending arm thereof a forwardly extending lug which is adaptable to a control disk 268 on the shaft 269. Each of the disks has an opening therein which will allow the associated lever 266 to move clockwise when printing is to occur in that order. The shaft 269 as well as the individual disks 268 can be selectively rotated so that selected ones or all of the levers 266 will be held against clockwise movement. Thus selective printing in the various orders can be obtained. It should be noted that although each of the aligning sectors 218 is moved clockwise during the straightening of the toggles, and hence each of the control levers 266 will move away from their associated hammer slides 245, the return of the nonselected aligning sectors 218 to their FIG. 3 positions by the springs 232 will return the levers 266 associated with the nonselected orders to their hammer blocking positions. Since the hammer firing bail 260 holds the lower ends of the slides 245 below the downwardly extending arms of the levers 266 it will be seen that the levers 266 readily move into and out of their positions of engagement with the associated slides 245.

Each of the hammer slides 245 is returned to its lowered position following each printing operation by means of a power operated restoring bail 270 (FIGS. 2, 3 and 9) which is operated by a cam 271. The cam 271 engages a roller on the lower arm of a lever 272 which is pinned to the shaft 229 (each of the previously explained levers on shaft 229 being free to rotate thereon). The forwardly extending arm of lever 272 is positioned below the rightwardly extending stud 273A on the lever 273. The front end of lever 273 is coupled by link 274 (FIG. 2) with the right arm of the restoring bail 270 which is pivoted at 275. Since the restoring bail 270 engages each of the slides 245 and must restore each of said slides to its set position against the urge of the hammer firing springs 248 a parallel drive for said bail 270 is provided. To this end a second lever 276 (FIG. 8) is secured to the left end of shaft 229 and operates a link 277 which is similar to the link 274. Since the levers 276 and 272 are the only levers which are pinned to the shaft 229 it will be seen that the lever 276 will be operated only in response to the clockwise drive of cam 271.

After the printing operation has occurred the parts are restored to their initial or home positions of FIG. 3. It will be recalled that the latches 233 (FIG. 3) held the toggles formed by links 220 and 217 in a straightened condition. The means for releasing each of said latches 233 near the end of a printing operation includes a bail 280 (FIG. 3) pivoted on shaft 222 and having a crossarm 280A which is positioned in front of the upwardly extending lugs on the latches 233. A spring 281 urges the bail 280 clockwise away from the latches. The rearwardly extending arm 280B (FIG. 9) of bail 280 is forked and encompasses the rightwardly extending stud on the lever 282 carried by shaft 229. A cam 283 on the main driveshaft 225 engages the roller on lever 282 and thereby rocks bail 280 counterclockwise after approximately 300° of rotation of shaft 225. Therefore each of the latches 233 is moved clockwise to release the associated lever 231.

From the above it will be seen that the printing mechanism will operate to print numerical amounts in accordance with the differential movements of the add racks 213 which in turn move rearwardly under the control of the digit keys. In addition to the digit printing sectors there is provided a plurality of individually variably movable punctuation printing members in the form of sectors 300 which are disposed between adjacent ones of the digit printing sectors. Since the punctuation sectors are arranged in an ordinal array they will be identified as 300–1, 300–2, etc. For example, in FIGS. 1 and 4 it will be seen that the punctuation sector 300–1 is disposed on the left side of the digit sector 210–1.

Each of the punctuation sectors has a decimal font and a comma font with the decimal font being located beneath the comma font. The front ends of each of the punctuation sectors 300 is slotted and encompasses the shaft 261 which supports the hammer firing control bail 260 (FIG. 2). Thus each of the punctuation sectors is free to move forwardly and rearwardly for a printing operation. As seen in FIGS. 3 and 4 each of the punctuation sectors has an inverted L-shaped opening therein which provides a vertical driving surface 300A. As seen in FIG. 3 the punctuation sectors 300 are normally maintained in a lowered or clockwise position where the printing fonts thereon are disposed below the printing line. Each of the digit sector levers 212 has a rightwardly extending lug 212B as well as a leftwardly extending lug 212C near the upper end thereof. It will be seen from FIG. 3 that when the punctuation sectors 300 are in their lowered or home positions the lugs 212B and 212C will each be above the vertical driving surfaces 300A on the punctuation sectors. Therefore if the punctuation sectors are retained in their lowermost positions of FIG. 3 the digit printing sectors can be driven rearwardly without affecting the punctuation sectors. However if a punctuation sector is elevated by a first step of movement the vertical driving surface 300A thereon will be moved upwardly by an amount sufficient to bring said driving surface 300A in alignment with the rightwardly extending lug 212B of the adjacent higher order sector lever 212. That is, if the first order punctuation sector 300–1 is moved upwardly by one step the rightwardly extending lug 212B on the second order digit sector lever will be aligned with the vertical driving surface 300A thereon. Accordingly if the second order digit sector 210–2 is driven rearwardly the first order punctuation sector will be carried therewith to cause a comma to print between the units and tens orders.

If a punctuation sector is elevated by two steps to bring the decimal font thereon to the printing line the vertical driving surface 300A will be in alignment with the leftwardly extending lug 212C of the adjacent lower order digit printing sector lever. It should be noted that the shape of the opening in the punctuation sectors is such that if a punctuation sector is elevated to its comma printing position the leftwardly extending lug 212C on the adjacent lower order digit printing mechanism will have no effect thereon since the lug 212C will be moving in the upper elongated portion of the opening in the punctuation sector. If a punctuation sector is elevated to the decimal printing position it will be seen that the leftwardly extending lug 212C on the adjacent lower order mechanism will be engageable therewith. Therefore the punctuation sectors are coupled with an adjacent higher order digit printing mechanism for comma printing and an adjacent lower order digit printing mechanism for decimal printing.

Referring now to FIG. 3 it will be seen that each of the punctuation sectors 300 is supported at its front end by the shaft 261 and near the rear portion thereof by means of a downwardly extending punctuation sector support lever 301 which is pinned at its lower end to the forwardly extending arm on a small lever 302 pivoted on a shaft 303. A spring 304 connected to a stationary shaft and to the lower rearwardly extending end of the lever 301 urges lever 301 upwardly and lever 302 in a clockwise direction. Each lever 302 has a rightwardly extending stud 302A which is positioned on the top surface of a sensing pin 306 (FIG. 1). The sensing pins 306 are supported in slots provided in the upper and lower horizontal plates 307 and 308 (FIGS. 1 and 7) which are carried by the left and right slides 309 and 310 (FIGS. 2 and 3). As will be described hereinafter the slides 309 and 310 together with the plates 307 and 308 form a sensing carriage which can be moved forwardly and rearwardly in the machine to bring the downwardly extending sensing ends of the pins 306 into alignment with a selected one of the punctuation control slides 311, 312 or 313 (FIG. 3) supported by studs 333 and 334 extending forwardly from the frame 335 which is in turn secured to frame 336.

A small control bail 314 extends across the upper surfaces of the levers 302 (FIG. 1) and is engageable with the upwardly extending lugs provided on the upper surfaces of each of the levers 302. Bail 314 carries a roller 315 which is maintained in engagement with the cam 316 (FIG. 9). With the main drivershaft 225 in its home position of FIG. 9 the cam 316 will hold the bail 314 in its counterclockwise position of FIG. 3 where it will serve to hold each of the levers 302 in a counterclockwise position with the punctuation sectors 300 thereby being held in their lowered or most clockwise positions. As seen in FIG. 4 a spring 318 is disposed within the rectangular slots provided in each of the sensing pins 306 and serves to urge each of said pins upwardly. As the shaft 225 rotates it will be seen from FIG. 9 that the bail 314 will move clockwise as the roller falls off the high portion of cam 316 and therefore each of the levers 302 will move clockwise under the urge of springs 304. As a result each of the sensing pins 306 will be moved downwardly into engagement with one of the punctuation control slides.

As seen in FIG. 7 each of the three slides 311, 312 and 313 has a set of rectangular openings or notches cut therein. Each slide has a single notch or rectangular opening, 311A, 312A and 313A, which is approximately twice as deep as each one of the adjacent plurality of openings 313B, 312B and 311B. When a sensing pin enters a deep opening the associated punctuation sector 300 will be elevated to its decimal printing position. When a sensing pin 306 enters a shallow opening such as 311B the associated punctuation sector will be elevated to its comma printing position. The spacing of the shallow openings is such that when a given sensing pin enters a deep opening 311A, 312A or 313A and the associated punctuation sector moves to its decimal position, each third higher order punctuation sector will be elevated to its comma printing position since each of the third higher order sensing pins will enter a shallow opening. Thus it is seen that when a selected one of the sensing pins is aligned with a deep opening in one of the three control slides one of the punctuation sectors will move to its decimal printing position and each of the third higher order punctuation sectors will move to its comma printing position. However, as previously explained, the movement of a given punctuation sector toward the platen will be determined by the operation of an adjacent higher or an adjacent lower order digit printing sector.

Each of the levers 301 has a rightwardly extending stud 301A (FIG. 4) which underlies the rearwardly extending tail of an associated latch 233. As previously described and as seen in FIGS. 3 and 4 the latches 233 serve to hold the levers 231 in a clockwise position when an associated add rack 213 moves rearwardly since the cam surface 214A on the associated arcuate sector 214 cams the latch 233 counterclockwise. As seen in FIG. 4 the rightwardly extending stud 301A will also serve to rock the latch 233 to the right thereof in a counterclockwise direction when the sensing pin 306 associated with that lever 301 enters a deep opening in a control slide. The dotted line position for the stud 301A in FIG. 4 indicates the position which said stud occupies when the associated sensing pin enters a shallow opening 312B in a control slide. The arrangement is such that a stud 301A will operate the latch 233 to the right thereof only when the sensing pin associated therewith enters a deep opening in a control slide. Each of the latches 233 has a rightwardly extending lug 233A which extends to the right and is positioned in front of the downwardly extending portion 233B of the adjacent lower order latch 233. Therefore when any latch 233 is held in its counterclockwise position it will be seen that each of the latches 233 to the right thereof will in turn be held in its counterclockwise position. As a result thereof every digit printing sector 210 lying to the right of an operated latch 233 will be held in printing position and will not be returned to its disabled position of FIG. 3 by the bail 221 and springs 232 in the manner previously described. Since the studs 301A on the levers 301 extend to the right under the rear ends of levers 233 it will be seen that the printing sector 210 lying to the right of a punctuation sector which is moved to its decimal printing position will be held in an operative position and therefore each lower order sector also will be held operative by a lug 233A. Accordingly any zero to the right of a decimal and between the decimal and the first nonzero digit in a number which is less than one will be printed. For example in FIG. 4 the units, tens and hundreds orders of the printing mechanism are positioned for printing ".005" with their punctuation sector 300–3 being elevated to its decimal printing position. It will be seen that since the tens and hundreds orders add racks 213 have not moved rearwardly the digit printing sectors 210–2 and 210–3 in those two orders will only be raised to their zero printing positions. As previously described the bail 221 (FIG. 3) moves clockwise during the early portion of each cycle to engage each of the levers 231 and elevate each digit sector to the zero position. Thereafter the bail 221 returns counterclockwise to its FIG. 3 position and the springs 232 attempt to pull each of the levers 231 counterclockwise and hence restore each of the digit sectors to their home positions of FIG. 3. The movement of an add rack 213 causes a latch 233 to hold each digit sector which has been moved beyond zero position against the restoring urge of the springs 232. As seen in FIG. 4 when the punctuation sector 300–3 was moved to its decimal position, the rightwardly extending stud 301A on the lower end of the lever 301 engaged the rearwardly extending tail of the latch 233 associated with the hundreds order digit printing sector. Therefore even though the hundreds order digit printing sector 210–3 was not moved beyond its zero position the latch 233 associated therewith is operative to hold the associated lever 231 against the counterclockwise urge of spring 232. Therefore the hundreds order digit printing sector remains in its zero printing position. The rightwardly extending lug 233A on the hundreds order latch 233 engages the downwardly extending portion 233B of the tens order latch 233 and therefore the tens order digit sector 210–2 is held in the zero printing position. The units order add rack 213 is illustrated as having moved rearwardly by five units under the control of the numerical keys to thereby elevate the units order digit sector 210–1 to the "5" printing position. Thus the units order latch 233 will hold the units order lever 231 against counterclockwise movement.

Since there is no active latch 233 in any order to the left of the hundreds order in the example shown in FIG. 4 it will be seen that the higher order digit sectors 210 will be returned to their inactive positions prior to the time that the hammers are released. It should be noted in FIG. 4 that the third punctuation sector 300–3 serves to hold the hundreds order digit sector 210–3 in its active position by controlling the latch 233. Therefore the hammer mechanism associated with the hundreds order will operate to drive the hundreds order digit sector rearwardly during the printing operation. The leftwardly extending stud 212C on the hundreds order sector lever 212 in moving rearwardly will drive the punctuation sector 300–3 rearwardly to cause the decimal to be printed. Accordingly ".005" will be printed.

When the machine is being used to print monetary amounts it is advantageous to be able to print a safeguard symbol immediately adjacent to the highest order digit. The mechanism for accomplishing this in accordance with the present invention is illustrated in FIGS. 1 and 3. In FIG. 1 the digit and punctuation sectors have been elevated to the proper positions for printing 5,999.99 and in addition the seventh order digit sector 210–7 has been retained in a position such that the safeguard symbol "$" is in the printing position. The mechanism for holding the seventh order digit sector in the safeguard position includes a safeguard symbol control lever 320 which is pinned to the upper portion of the sixth order lever 231. There is a lever 320 (FIG. 3) associated with each of the levers 231 and each has a leftwardly extending lug 320A (FIG. 1) which extends to the left by an amount sufficient to be in alignment with the upper front vertical surface of the adjacent higher order lever 231. The relationship of the lugs 320A with respect to the adjacent higher order lever 231 is such that when any lever 231 is held in its most clockwise position by its associated latch 233 the safeguard symbol control lever 320 pinned thereto will prevent the complete return of the adjacent higher order lever 231 to its counterclockwise position of FIG. 3. That is, the leftwardly extending lug 320A will allow the adjacent higher order lever 231 to move part of the way toward its counterclockwise position under the urge of spring 232 and therefore will cause the adjacent higher order digit sector 210 to be held in its safeguard symbol printing position. Thus it is seen that the digit sector 210 immediately to the left of the highest order digit in a monetary amount will be positioned to print the safeguard symbol.

As seen in FIG. 3 the forwardly extending ends of the safeguard symbol control levers 320 are disposed within slots provided in a bail 321 pivoted on the inner sides of frames 226 and 227. In the event that numbers are to be printed without the safeguard symbol feature being active the bail 321 is rocked counterclockwise to move the front ends of the levers 320 downwardly to a position where the leftwardly extending lugs 320A will be disposed beneath the front vertical surfaces on the upper portions of the levers 231. Accordingly with the bail 321 in its counterclockwise position the lugs 320A will have no effect on the levers 231 and printing will be effected without the safeguard symbol. The bail 321 will be seen in FIG. 3 to have a forwardly extending arm 321A at its left end to permit manual positioning of said bail. The left rear end of the bail 321 has a pair of detent notches therein for receiving the roller carried on the upper end of the detent lever 322 pivoted at 323. A spring 324 urges the detent lever in a counterclockwise direction to maintain the bail 321 in a selected one of two positions. For the printing of ".005" as illustrated in FIG. 4 the bail 321 is moved to its counterclockwise position to disable the safeguard symbol feature.

It should be noted in FIG. 1 that the punctuation sector 300–2 which is positioned between the second and third order digit sectors 210–2 and 210–3 is elevated to its decimal printing position in response to its associated sensing pin 306 entering a deep notch in the punctuation control slide 311. The third and fourth sensing pins 306 engage the top surface of the control slide 311 and therefore the punctuation sectors associated therewith will be held in their lowered positions. The fifth punctuation sector 300–5 which is positioned between the fifth and sixth order digit sectors 210–5 and 210–6 is elevated to its comma printing position since its associated sensing pin 306 is aligned with and enters a shallow notch 311B in the control slide 311. Since the sixth order digit printing sector 210–6 is operative for the printing operation the rearward movement thereof by its associated hammer will cause the rightwardly extending lug 212B to drive the punctuation sector 300–5 rearwardly. It should be noted that if the sixth order digit sector had been held in its disabled position the punctuation sector 300–5 would not be driven rearwardly since the leftwardly extending lug 212C associated with the fifth order digit sector would pass above the vertical driving surface of the punctuation sector.

From the above it will be seen that the punctuation printing mechanism of the present invention is adapted to print decimals and commas in selected positions in accordance with the positioning of the control slides 311, 312 and 313. The slide 311 is used for controlling the punctuation sectors during the listing of monetary amounts and has a home position in which its deep opening 311A is aligned with the second punctuation sector 300–2. Therefore when the sensing pins 306 are aligned with the control slide 311, which may be termed the monetary control slide, the second sensing pin 306 associated with the second punctuation sector 300–2 will always enter the deep notch in the monetary slide 311. Accordingly a decimal will always be printed between the tens and hundreds orders for monetary amounts. The punctuation slides 312 and 313 are used for printing decimal amounts which are nonmonetary, with the slide 312 being used to control the punctuation sectors during the printing of individual numbers or individual factors in a multiplication operation and the slide 313 being used to control the punctuation sectors during the printing of a product. The manner in which the positions of the slides 311, 312 and 313 are controlled will now be described with reference to FIGS. 5, 6 and 7.

The punctuation printing mechanism is illustrated as being used with a ten key calculating machine and therefore as seen in FIG. 5 the machine is provided with the usual ten numerical keys 20 together with a decimal key 340. The digit keys 20 are used for entering numerical amounts into the machine and can be used with a conventional pin carriage such as that which is well known in the ten key calculating machine art. However for purposes of illustration the numerical input mechanism shown herein is substantially the same as that disclosed in the previously identified copending application of Georg K. Caspari. As disclosed in said Caspari application the numerical keys are operative to trigger a power driven device which then operates to set an add rack limiting element to the proper position for limiting the rearward travel of the add racks 213.

It will be seen in FIG. 5 that each of the numerical keys 20 has associated therewith a keystem 21 which is supported for upward and downward movement by means of a stationary shaft 22 and the bottom plate 23. Individual springs 24 urge the keys to their upward position. Each of the keystems 21 has a leftwardly extending rectangular lug 26 which is disposed at an angle such that one of the flat surfaces thereon is adaptable to an angled cam surface on the upper front end of an associated horizontal slide 27 supported adjacent to the left side of each keystem. Each slide 27 has a single rearwardly extending lug 27A which is aligned with one of the lugs extending forwardly along the front edge of the horizontal indexing slides 29. There are ten indexing slides controlled by the numerical keys, each of the indexing slides 29 being supported by a small stationary plate at their right rear ends and also by the stationary plate 45 at their left rear ends. The plate 45 is secured to a main stationary frame 71. Thus the slides 29 are supported for forward and rearward movement, each of said slides being spring urged to a forward position as are the slides 27. When a numerical key is depressed a slide 27 is cammed rearwardly which in turn drives one of the slides 29 rearwardly. This movement in turn can be used to index a pin in a conventional pin carriage such as is well known in the art or as disclosed in the above-identified copending application the rearward movement of a slide 29 can be used to render operable a powered indexing mechanism. To this end each of the slides 29 is provided with a cam surface 29A and a latching surface 29B, with the cam surface being disposed adjacent to a chamferred edge of a vertical bar 31A which is an integral part of a small movable frame 31. Each of the slides 29 in the embodiment illustrated in FIG. 5 has a rearwardly extending portion 29C which as described in the above-identified application serves to limit the extent of movement of an add rack limiting element. The relationship of the cam surface 29A and latching surface 29B with respect to frame 31 is such that when a single slide 29 is moved rearwardly the frame 31 is driven to the left and each of the remaining slides 29 is prevented from moving rearwardly.

A leftwardly extending link 32 secured to the left end of frame 31 has a rearwardly extending stud 32A which is disposed in the upper end of an arcuate slot provided in the right end of a lever 33 secured to a sleeve 37 supported by shaft 34. The rear end of stud 32A is maintained in engagement with the right end of a cam control slide 36 supported by the sleeve 37 and by a rearwardly extending shaft 38 which interconnects the lever 33 with a similar lever 39 which is secured to the rear end of the sleeve 37. Slide 36 has a rearwardly extending lug 36A which serves to control a conventional snail-back cam 40 supported on a shaft 41 extending between the levers 33 and 39. The cam 40 is provided with two sets of control lugs which cooperate with the lug 36A in a manner which is well known in the typewriter art to allow the cam 40 to undergo 180° of rotation when the slide 36 releases the cam 40 for operation. A lever 42 pivoted on the sleeve 37 is urged in a clockwise direction by a spring 43. The lever 42 is engaged with a diamond shaped cam surface on the left side of the cam 40 so that the cam 40 is constantly urged in a clockwise direction against the lug 36A.

A rubber power roll 50 is supported beneath the cam 40 and is constantly driven in a counterclockwise direction by conventional power means. The slide 36 is urged to the right by a spring 57 so that its lug 36A normally engages one of the outer lugs on the cam 40 and hence serves to normally hold cam 40 away from the power roll 50. When the frame 31 is moved to the left upon the operation of a numerical key the slide 36 will be driven to the left to thereby release the cam 40 for a slight clockwise movement. This brings the cam 40 into engagement with the power roll 50 and thereafter cam 40 is positively driven in a clockwise direction on shaft 41. As a result the levers 33 and 39 are driven counterclockwise around shaft 34. The shape of the slot in the right end of lever 33 which receives the stud 32A is such that as the lever 33 is rocked counterclockwise the frame 31 is positively held in its leftward position. As a result the slide 36 is held to the left where its lug 36A is in a position to engage one of the inner lugs on the cam 40 to cause disengagement of the cam from the power roll 50. As a result the cam 40 rotates through a 180° and causes the levers 33 and 39 to be positively driven upwardly and then to be pulled clockwise by the spring 82 back to the position of FIG. 5.

The above-described power drive of the levers 33 and 39 in response to the depression of a numerical key is utilized to drive an add rack limiting element to its indexed position in the manner described in the Caspari application. To this end the lever 39 is coupled with a lever 80 by means of the spring 82 to thereby cause the lever 80 to be pulled in a counterclockwise direction for the indexing operation. The power drive of the levers 33 and 39 is used in the present invention to control the stepwise movement of the punctuation control slides, the operation of which will now be described with reference to FIG. 7 of the drawings. It should be understood that any conventional keyboard entry device such as is common in the art can be used to control the printing mechanism of the present invention.

In FIG. 7 it will be seen that the punctuation control slide 312 has a leftwardly extending portion, the bottom edge of which is adapted to receive the teeth of a gear 350 secured to the rear end of a shaft 351. The front end of the shaft 351 carries a ratchet wheel 352 which is adapted to be driven by a driving pawl 353. The driving pawl 353 is pinned to the right end of a lever 354 pivoted on the front side of a stationary plate 355 which supports the rear end of the shaft 34 seen also in FIG. 5. The downwardly extending portion of the previously described lever 39 has a rearwardly extending stud 39A which is disposed within a slot provided in the left end of the lever 354. Thus it will be seen that the driving pawl 353 will be driven downwardly each time the lever 39 is driven in a counterclockwise direction by the power roll and cam arrangement of FIG. 5. However the lower end of the pawl 353 is normally held to the left of the teeth of the ratchet wheel 352 by means of a slide 356 supported by a stud and slot connection for movement in a horizontal direction. A spring 357 connected to rearwardly extending studs on the driving pawl 353 and the slide 356 serves to urge the pawl 353 in a counterclockwise direction on the lever 354 to thereby maintain the roller 358 on the pawl 353 in engagement with the lower left end of the slide 356. A second spring 359 connected to a stud extending rearwardly from the frame 355 and to the stud extending rearwardly from the slide 356 serves to constantly urge the slide 356 toward the left to thereby normally maintain the lower end of the pawl 353 to the left of the ratchet wheel 353. Therefore the operation of the numerical key normally has no effect on the shaft 351 and hence has no effect on the punctuation control slides. A safety bail 330 supported by shaft 351 has a vertical portion 330A which is engaged by a stud 331 on slide 313 when the capacity of the decimal device has been reached. The front end of bail 330 is engaged with the roller 358 on pawl 353 and therefore the pawl 353 would be disengaged from the ratchet wheel in response to such counterclockwise movement of bail 330.

It will be seen in FIG. 7 that the keystem 360 of the decimal key 340 has a rightwardly extending stud which is engaged in a slot provided in a bellcrank lever 361. The downwardly extending end of the bellcrank lever 361 is forked and encompasses a leftwardly extending portion of a slide member 362. A bellcrank lever 363 supported for rotation about the stud 364 which supports the sliding member 362 has its leftwardly extending arm aligned with the downwardly extending stud 362A on the sliding member 362. A rearwardly extending lug 363A on the bellcrank lever 363 is engaged with the downwardly extending right end of the slide 356 in a manner such that when the bellcrank lever 363 is rocked clockwise the slide 356 will be pulled to the right. Thus it is seen that when the decimal key 340 is depressed the slide 356 will be pulled to the right and hence the driving pawl 353 will be brought into alignment with the teeth of the ratchet wheel 352 so that the subsequent operation of a numerical key will cause the ratchet wheel and shaft 351 to be stepped one unit in a counterclockwise direction. Thus the punctuation control slide 312 will be stepped to the left in response to the succeeding operation of the numerical keys following the depression of the decimal key during the entry of a number. A latching member 365 pivoted on the rear side of frame 355 is urged in a clockwise direction by the spring 366 and therefore its forwardly extending lug 365A is maintained in engagement with the top surface of slide 356. The upper surface of slide 356 whch is disposed beneath the lug 365A is provided with a latching notch so that when the slide 356 is pulled to the right by the operation of the decimal key the latch 365 will rock clockwise into latching engagement with the slide 356 and thereby hold slide 356 in its rightward position. Therefore the driving pawl 353 will be held in alignment with the teeth of the ratchet wheel 352.

The pawl 353 must be disengaged from the ratchet wheel 352 following each printing cycle of operation so that the stepping of the punctuation control slides during the entry of a subsequent amount will be determined by the location of the decimal in such subsequent amount. To this end a latch releasing lever 104 pivoted at 105 on the rear side of frame 355 is rocked clockwise near the end of each cycle of operation of the main driveshaft 225. The lever 104 has a rearwardly extending stud 109 which engages the downwardly extending left end of the latching member 365 when the lever 104 is rocked to thereby cause release of the slide 356 for return to its leftward pawl disabling position. As seen in FIG. 7 the left end of lever 104 is coupled with a driving lever 100 by means of a connecting link 103. Lever 100 carries a roller 102 at its rear end which is engaged with a cam 370 on the main driveshaft 225. As will be seen in FIG. 9 the cam 370 is so shaped that the operation of the latch releasing lever 104 is delayed until near the end of the cycle of operation of shaft 225. The timing of the operation of the lever 104 is advantageously the same as the time during which the pin carriage (or similar numerical entry device) is restored to its home position so that the cam 370 and lever 100 can provide the power for such restoring operation in the manner disclosed in the above-identified Caspari application.

It will be seen in FIG. 7 that the punctuation control slide 312 has a rearwardly extending stud 312C which passes through a hole in the slide 311 disposed to the rear thereof. A spring 371 connected to the lower surface of slide 311 thus serves to urge the slides 311 and 312 toward the right, the two slides 311 and 312 moving together as a unit. A pawl 372 pivoted on the stationary shaft 333 which supports the punctuation control slides is spring urged in a counterclockwise direction to maintain its downwardly extending nose disposed between adjacent ones of the forwardly extending lugs 312D on the lower surface of the slide 312. Thus when the slide 312 is stepped to the left by the stepwise rotation of shaft 351 in response to the operation of numerical keys after the decimal key has been operated, the pawl 372 will serve to hold the slide 312 in its displaced position against the rightward urge thereon provided by spring 371.

A pawl 375 pivoted on the stud 376 extending rearwardly from slide 313 is urged in a clockwise direction by a spring 377 so that its downwardly extending nose is disposed between adjacent ones of the lugs 312D on slide 312. The shape of the nose on pawl 375 is such that when slide 312 moves to the left pawl 375 will remain engaged with the lugs 312D and hence the slide 313 will be stepped to the left with the slide 312. The lower left surface of the nose on pawl 375 is so shaped that when the slide 312 is released for rightward movement the pawl 375 will merely rock over the lugs 312D without interferring with the rightward movement of slide 312. Thus it will be seen that the three slides 311, 312 and 313 move to the left as a unit as the shaft 351 is rotated but that slides 311 and 312 can move to the right independently of the slide 313. A third pawl 378 pivoted on shaft 373 and urged in a counterclockwise direction thereon is engageable with the lugs 313D on slide 313 and hence serves to hold slide 313 against rightward movement and yet allow leftward movement thereof. A spring 379 connected to the stud 331 on left end of slide 313 and to a stationary frame serves to urge the slide 313 to the right.

The sensing pins 306 are normally positioned in alignment with the rearmost punctuation control slide 311 which as previously described has its deep opening 311A aligned with the punctuation sector 300–2 which is disposed between the tens and hundreds orders of the digit printing sectors. An operation control key 460 (FIG. 6) is provided which serves to initiate a cycle of operation without affecting the position of the sensing pins 306. Therefore when monetary amounts including dollars and cents are being listed on the machine the operator need not depress the decimal key each time. Since the slide 311 is movable, the operator can list monetary amounts in fractions of a cent by operating the decimal key prior to entry of such fractions of a cent. During multiplication of monetary amounts, however, the decimal key is operated prior to entry of the "cents," and the usual multiplicand and multiplier keys are used instead of the listing key 460. This provides the advantage that when a large number of monetary amounts is being listed the extra operation of depressing the decimal key is not required. For example, when $5,999.99 is being listed the operator merely enters the digits and the machine automatically causes the decimal and comma to be printed in the proper position as well as the safeguard symbol (as illustrated in FIG. 1).

When nonmonetary amounts are being entered into the machine or when multiplication is being performed, the sensing pins 306 are moved into alignment with the decimal slide 312. As previously described the decimal slide 312 has its deep opening 312A positioned to the right of the first punctuation sector 300–1 when the slide 312 is in its right-most home position (illustrated in FIG. 7). Therefore with the slide 312 in its rightmost position the three shallow notches 312B therein will be aligned with the punctuation sectors 300–3, 300–6 and 300–9 to provide commas between the third and fourth, sixth and seventh, and ninth and tenth digits in a number having no digits to the right of the decimal. When a number having digits to the right of the decimal is entered by the operation of the numerical keys 20 the slides 311, 312 and 313 will be stepped to the left one step for each digit entered following the operation of the decimal key. Therefore the deep notch 312A will step to the left to cause subsequent printing of a decimal in the proper position. The means for moving the sensing pins 306 forwardly by the proper distance to bring their lower ends in alignment with the slide 312 will now be described.

The sensing pins 306 are supported by the top and bottom plates 307 and 308 (FIG. 7) which are in turn carried by the sliding members 309 and 310. The sliding members 309 and 310 are slotted at their rear ends and are supported by a shaft 390 carried by brackets on frame 335. The front ends of the sliding members 309 and 310 are carried by the shaft 391 extending between levers 392 and 393 pinned to shaft 394. A lever 396 pivoted on the frame 227 carries a rearwardly extending forked member 397 which encompasses a sleeve on the shaft 391 carried by levers 392 and 393, spring means being provided to urge the shaft 391 forwardly and the forked member 397 rearwardly to maintain the shaft 391 in the closed end of the forked member 397 (FIG. 9). A spring 398 urges the lever 396 in a counterclockwise direction to maintain a roller 399 (FIG. 9) in engagement with a cam 400 on the main driveshaft 225. As seen in FIG. 9 the cam 400 presents a flat surface of relatively short distance from the center of shaft 225 when shaft 225 is in the home position of FIG. 9. Therefore the spring 398 serves to hold the sensing pins 306 in their rearmost positions in alignment with the rearmost punctuation control slide 311. During each machine cycle the cam 400 in rotating counterclockwise will drive lever 396 clockwise to thereby urge the sliding members 309 and 310 forwardly to a position where the pins 306 are aligned with a selected one of the punctuation control slides.

The extent of forward movement of the sensing pins is controlled by a stepped control slide 401 (FIG. 7) supported by stud and slot connections on the right side of a stationary frame 402. The stepped slide 401 has three vertical surfaces on its rear side which are adaptable to a rightwardly extending stud 403 carried at the upper end of a lever 404 pinned to the right end of shaft 394. A link 405 connected to the upper front end of the stepped slide 401 and having a vertical slot in its upper end which encompasses a rightwardly extending stud on a lever 406 renders the slide 401 responsive to the position of the lever 406. A detent 407 having a rightwardly extending stud engaged in one of the two slots provided in the rear surface of lever 406 serves to hold said lever 406 in one or the other of two fixed positions.

The upper end of lever 406 is manually settable by the operator in one or the other of its two positions. When the lever 406 is in its most clockwise position, as illustrated in FIG. 7, the rightwardly extending stud 406A thereon will be so positioned that the stepped slide 401 will be in its lower-most position as illustrated in FIG. 7. Accordingly the rearmost one of the three stepped surfaces on the slide 401 will be aligned with the stud 403 on lever 404. Therefore when the cam 400 rocks lever 396 clockwise the stud 403 will undergo very little movement before it engages the slide 401. Therefore the sensing pins 306 will remain in alignment with the punctuation control slide 311. As previously explained the arrangement of the notches in the punctuation slide 311 is such that the deep opening or notch 311A is aligned with the second punctuation sector 300–2 when the slide 311 is in its rightmost position. Thus it is seen that by placing the lever 306 in its most clockwise position as in FIG. 7 the punctuation printing will be controlled by slide 311. Accordingly the machine is set for listing monetary amounts and an operator in so entering the monetary amounts through the use of the control key 460 need not operate the decimal key in order to obtain the printing of a decimal between the dollars and cents in the amounts entered. Since the slide 311 which controls monetary printing is movable, it is seen that if fractions of a cent are to be entered and printed, the operator merely depresses the decimal key prior to entry of the fractions of a cent. It should be noted, and as pointed out hereinafter, the slide 311 is used for the listing of monetary amounts (and for controlling the printing of a total with the lever 406 in its monetary position). When monetary amounts are involved in a multiplication operation, the usual multiplicand and multiplier keys described hereinafter are used, with the operator then depressing the decimal key prior to the entry of the cents.

When the machine is being used for printing nonmonetary amounts (or for multiplication of monetary amounts) it will be seen that the sensing pins 306 must be positioned above slide 312 or slide 313 since their deep openings 312A and 313A are normally positioned to the right of the lowest order punctuation sector 300–1. When the machine is being used for the entry of nonmonetary amounts the lever 406 is moved to its counterclockwise position to thereby pull the stepped slide 401 upwardly by one unit of movement. The intermediate vertical surface on the rear edge thereof will then be aligned with the rightwardly extending stud 403 on lever 404. With the stepped slide 401 thus elevated by one step it will be seen that when the cam 400 rotates and drives lever 396 clockwise the sliding members 309 and 310 and hence the sensing pins 306 will be pulled forwardly by an amount determined by the distance which the stud 403 undergoes before it engages the intermediate stepped surface on slide 401. The spacing of the intermediate stepped surface on slide 401 from stud 403 is such that when the stud 403 engages the intermediate stepped surface on slide 401 the sensing pins 306 will be aligned with the middle punctuation control slide 312. Therefore the decimal and comma printing will be determined by the openings in the punctuation slide 312.

As previously described the slide 312 is stepped to the left by the entry of digits following the depression of the decimal key. Since the slide 312 is normally positioned with its deep opening 312A disposed to the right of the first order punctuation sector 300–1 it will be seen that the decimal point will be properly positioned for the printing of any numerical amount having a decimal amount included therein if the decimal key is operated during the sequence of digit entry. For example if the digits 7894 were entered, then the decimal key operated, and then the digits 32 were entered, the decimal slide 312 would be stepped two spaces to the left. Accordingly the deep opening in the slide 312 would be aligned with the second punctuation sector 300–2, and the first shallow opening 312B would be aligned with the fifth punctuation sector 300–5. Accordingly the amount would be printed as "7,894.32."

When the machine is being used to perform multiplication the punctuation slide 312 is used to control the printing of the multiplicand and the multiplier while the slide 313 is used for controlling the printing mechanism for the printing of the product. Therefore it is seen that the slide 312 must be released for movement to its home position following the entry of a multiplicand so that it will be properly located for the subsequent printing of a multiplier. However the slide 313 which accumulates the number of decimal positions to the right of the decimals in the multiplicand and the multiplier must be retained in its moved position until the product is printed. The various latching pawls 372, 375 and 378 are selectively operated to accomplish the releasing of the slides 312 and 313 at the proper times.

Referring now to FIG. 7 it will be seen that cam 238 carries a rightwardly extending stud 238A which is engageable with a lever 410 near the end of the rotation of the main driveshaft 225. Lever 410 carries a rightwardly extending stud 411, the upper right end of which is flattened to be compatible with a right angled notch provided in the downwardly extending arm of a small lever 412 pivoted on the left side of a vertical slide 413. A spring 414 connected to the lever 412 and to the slide 413 serves to constantly urge the lever 412 in a clockwise direction to maintain the right angled surface of the lever 412 in engagement with the right end of the stud 411. Stud 411 passes through an opening in a second slide 416 which is similar to the slide 413, the difference being that slide 416 will always be responsive to movement of the stud 411 while slide 413 will be responsive to movement of the stud 411 only when the lever 412 is in its clockwise position as illustrated in FIG. 7. The upper ends of the slides 416 and 413 are supported for vertical movement on the stud extending to the left from the stationary frame 227.

The lower end of slide 416 is pinned to the forwardly extending end of a bellcrank lever 417 pivoted on the stud 418 and having a rearwardly extending arm 417A which overlies the upper end of the pawl 372 associated with the lugs 312D on slide 312. The lower end of slide 413 is pinned to the forwardly extending arm of a bellcrank lever 419 which is adjacent to the bellcrank lever 417 and has a rearwardly extending arm which overlies the upper end of the latching pawl 378 associated with the lugs 313D on the control slide 313. It should be noted that the rearwardly extending arm 417A of bellcrank lever 417 passes over the upper end of the pawl 378 but is not engageable therewith so that when the bellcrank lever 417 is moved in responsive to the movement of slide 416 the pawl 378 will not be affected thereby. It will thus be seen that near the end of each 360° of rotation of driveshaft 225 the slide 416 will be driven upwardly and bellcrank lever 417 will be driven in a clockwise direction. As a result thereof the pawl 372 will be rocked clockwise so that slides 312 and 311 will be returned to their rightmost positions near the end of each cycle of operation of the main driveshaft 225. It will also be seen that if the lever 412 remains in its FIG. 7 position during the time that stud 411 is being driven upwardly slide 413 will be driven upwardly and hence bellcrank lever 419 will be driven clockwise to thereby cause the latching pawl 378 to release slide 313 for movement to its rightmost home position. However, as described hereinafter, the lever 412 is rocked counterclockwise away from the stud 411 during the entry of the multiplicand and the multiplier and therefore the slide 313 is not released during the entry of such factors.

The lever 412 is controlled from the product key through the operation of a lever 420 pivoted on the right side of the stationary frame 402 and having a leftwardly extending stud 420A which overlies the front end of the lever 412. A link 421 connects the lever 420 with a bellcrank lever 422 pivoted on a stud extending to the right from the frame 402. The bellcrank lever 422 has a forwardly extending arm which is bent to the right to provide a rightwardly extending lug 422A which as seen in FIGS. 7 and 6 is disposed beneath a lever 424 and to the rear of the rearmost end of a lever 423. Lever 423 has a leftwardly extending lug 423A near its upper end which is disposed behind a downwardly extending portion of a slide 426 which is supported for forward and rearward movement beneath the operation control keys. Slide 426 has a single upwardly extending lug 426A which is aligned with the rightwardly extending stud 427A on the product keystem 427 which carries a product key 428. In a similar manner the lever 424 has a leftwardly extending lug 424A which extends to the left behind the downwardly extending portions of two slides 429 and 430 similarly positioned beneath the operation control keys for sliding movement forwardly and rearwardly.

Slide 429 carries a single vertical lug 429A which is disposed in alignment with the rightwardly extending stud 431A on the keystem 431 which carries a multiplicand key 432. Slide 430 has a single vertical lug which is aligned with the rightwardly extending stud 434A on the keystem 434 which carries the multiplier key 435. It will be seen that when the multiplicand or the multiplier key is depressed the lever 424 will be rocked clockwise while operation of the product key will cause the lever 423 to be rocked clockwise. A conventional cycle initiating mechanism including a single slide 436 disposed beneath each of the operation control keys is adapted to be cammed rearwardly in response to the operation of each of the operation control keys. The rear end of slide 436 is coupled with a leftwardly extending stud on a cycle initiating lever 437 which will be seen to be rocked counterclockwise when any operation control key is depressed. By means well known in the art, which forms no part of the present invention, the movement of the lever 437 in a counterclockwise direction will cause the main driveshaft 425 to be driven through 360° of rotation. During such rotation of the main driveshaft the slide 436 is held rearwardly to prevent operation of a second control key and also to hold an operated control key in its depressed position.

As seen in FIG. 7 the stepped slide 401 which controls the distance which the sensing pins 406 are moved forward has its lower end pinned to the rearwardly extending arm of a bellcrank lever 440 which is pivoted adjacent to the bellcrank lever 422 and has a forwardly extending arm which is bent to the right to form a lug 440A. Lug 440A underlies the rearwardly extending arms of the levers 423 and 424 as seen in FIGS. 6 and 7. In FIG. 6 it will be seen that since the lever 423 overlies the lug 440A the clockwise movement of lever 423 will cause bellcrank lever 440 to be rocked counterclockwise. The distance which the bellcrank lever 440 moves in response to the clockwise movement of lever 423 is such that the stepped slide 401 will be elevated to its maximum extent to bring the lowermost stepped surface thereon into alignment with the stud 403. Therefore when the product key 428 is operated the stepped slide 401 will be elevated so that the subsequent rotation of cam 400 in rocking lever 396 clockwise will cause the sensing pins 306 to be moved forwardly into alignment with the punctuation control slide 313. As a result thereof the punctuation in a product will be controlled from the slide 313. Since the lever 423 does not overlie the lug 422A it will be seen that the movement of lever 423 will not affect bellcrank lever 422. Therefore the lever 420 carrying stud 420A which overlies the end of lever 412 will not be moved from its FIG. 7 position when key 428 is operated. Accordingly cam 238 will be effective to drive slide 413 upwardly and cause bellcrank lever 419 to be rocked clockwise. The latch pawl 378 associated with the punctuation control slide 313 will thus be operated to release slide 313 for movement to its home position near the end of the rotation of the main driveshaft 225.

As previously explained the pawl 375 pivoted on the rear of slide 313 is spring urged into engagement with the lugs 312D on slide 312 and therefore in order for the slide 313 to reach its rightmost position it is seen that pawl 375 must be released. Pawl 375 has a forwardly extending stud 375A which overlies the upper surface of a small bail 450 free to rotate on shaft 394. A lever 451 pivoted on the upper end of a bellcrank lever 452 has its left end disposed beneath the bail 450. The lever 451 is further supported by the shaft 333 which supports the three punctuation control slides, said shaft 333 passing through an enlarged opening near the center of the lever 451. A rearwardly extending lug 451A on the lever 451 overlies the upper left surface of the pawl 378 and therefore when pawl 378 is rocked clockwise to release the slide 313 the lever 451 will be simultaneously rocked in a clockwise direction. As a result the bail 450 will elevate stud 375A and cause the release of pawl 375 from the lugs 312D on slide 312. Accordingly the slide 313 will be completely released for movement to its most rightward position as illustrated in FIG. 7. Thus it is seen that when the product key 428 is depressed the sensing pins 306 are moved forwardly into alignment with the punctuation control slide 313 prior to the time that the printing operation occurs so that the punctuation printing will be controlled from slide 313. The operation of the product key 428 has no effect on the lever 412 pinned to the sliding member 413 and therefore the pawl 378 is operated near the end of the product printing cycle of operation so that slide 313 is released for return to its rightmost position.

When the multiplicand or the multiplier key is operated the lever 424 (FIG. 6) is rocked clockwise and therefore the bell crank lever 422 will be rocked counterclockwise. As seen in FIG. 7 when the bellcrank lever 422 moves counterclockwise the lever 420 will be pulled clockwise and stud 420A thereon will move the lever 412 in a counterclockwise direction away from stud 411. Therefore the rotation of cam 238 and the associated rocking of lever 410 will have no effect on the sliding member 413. Accordingly the pawl 378 associated with the punctuation control slide 313 is not released in response to the operation of either the multiplicand or the multiplier keys.

It will be seen in FIGS. 6 and 7 that the lever 424 has a rectangular opening 424B provided in the lower surface thereof which is aligned with the lug 440A on bellcrank lever 440. The depth of the notch or opening 424B is such that the operation of lever 424 by the multiplicand or multiplier key will cause the stepped slide 401 to be elevated to a position where the intermediate stepped surface on the rear side thereof will be brought into alignment with the stud 403. Accordingly, as previously explained, the stud 403 will limit against the intermediate step of slide 401 to cause the sensing pins 306 to be brought into alignment with the punctuation control slide 312. Therefore the punctuation marks in the multiplicand or in the multiplier will be printed in accordance with the position of the punctuation control slide 312. It should be noted that when the lever 406 (FIG. 7) is in its clockwise position for placing the sensing pins 306 above the monetary punctuation control slide 311 the operation of the multiplicand or the multiplier keys will cause the stepped slide 401 to be elevated so that the punctuation printing will be controlled by the slide 312. The stepped slide 401 will similarly be elevated to its uppermost position in response to the operation of the product key 428 when the lever 406 is in the monetary position. When the lever 406 is moved counterclockwise the stepped slide 401 will be moved upwardly by one step and will be retained in its intermediate position. With the stepped slide 401 held in such intermediate position it will be seen that no movement thereof will occur in response to the operation of the multiplicand and the multiplier keys, but one step of movement will be caused by operation of the product key.

The operation of the mechanism for printing the necessary punctuation marks during a multiplication operation is as follows. First the lever 321A (FIG. 3) on bail 321 is moved counterclockwise to disable the safeguard symbol feature. The digits in the multiplicand are then entered into the intermediate storage device by the sequential operation of the numerical keys with the decimal key being operated in its proper sequence. This causes the punctuation control slides 311, 312 and 313 to be left by a number of units corresponding to the number of digits to the right of the decimal in the multiplicand. When the multiplicand key 432 is depressed a machine cycle will be initiated to cause the sensing pins 306 to move into alignment with slide 312 and the amount in the intermediate storage mechanism of the machine to be transferred to the multiplicand register via the add racks 213. After the add racks 213 have moved the digit sectors to their proper numerical positions for printing the multiplicand, the sensing pins 306 are released by the rotation of cam 316 so that the proper punctuation sectors will be moved to the proper positions for printing the decimal as well as the necessary commas. After the printing operation has occurred the various parts will be restored to their initial conditions except for the accumulating punctuation control slide 313 which will be retained in a position to the left of its home position by a number of steps corresponding to the number of digits to the right of the decimal in the multiplicand. The digits in the multiplier are then entered into the machine with the decimal key being operated in the proper sequence to cause the control slide 312 to be again stepped to the left from its home position by a number of steps corresponding to the number of digits in the multiplier to the right of the decimal. During such movement of slide 312 the pawl 375 will be effective to cause slide 313 to be simultaneously stepped to the left. The multiplier will then be printed with slide 312 controlling the punctuation printing. After the other parts have been restored to their initial conditions, slide 313 will be in a position to the left of its home position by a number of steps equal to the sum of the digits to the right of the decimal points in the multiplicand and the multiplier. After the multiplication process has been completed, as is well known in the art, the product key 428 is operated which causes the stepped slide 401 to be elevated to its uppermost position so that the product punctuation printing will be controlled by the slide 313. After the product has been printed the parts will be restored to their initial conditions including the slide 313 which will be returned to its home position in response to the operation of the bellcrank lever 419.

During the performance of a multiplication operation it is possible for an operator to correctly enter the multiplicand and then make a mistake during the entry of the multiplier digits. It is advantageous to have the machine so constructed that when this happens the operator can correct the error in the multiplier and re-enter the correct multiplier digits without the need for re-entering the multiplicand. To accomplish this the present invention includes an error correction key 470 (FIG. 6) having a downwardly extending keystem which carries a rightwardly extending stud 470A. The stud 470A is aligned with an angled surface on the upper edge of a slide 471 supported for forward and rearward movement in the same manner as are the previously described slides 426, 429 and 430. The downwardly extending lug 471A on the slide 471 is aligned with a rightwardly extending lug on the upper front end of a lever 472 pivoted on the shaft 473 which supports the levers 423 and 424. As seen in FIGS. 6 and 7 the rearwardly extending arm of the lever 472 passes over the top of the lugs 440A and 422A so that clockwise rotation of lever 472 will not affect the bellcrank levers 440 and 422. The rear end of lever 472 is engageable with the leftwardly extending front end of a small lever 474 pivoted at 476, the rear end of which is forked and encompasses the right end of the bellcrank lever 452. A spring 475 (FIG. 7) connected to the bellcrank lever 452 and to the frame of the machine maintains the bellcrank lever 452 in its most clockwise position as seen in FIG. 7.

As seen in FIG. 6 the keystem of the error key 470 carries a rightwardly extending lug which serves to cam the cycle initiating slide 436 rearwardly and hence the main driveshaft 225 will be driven through a cycle of operation in response to depression of the error key. However as is well known in the art no calculating cycle of operation will take place nor will a printing operation occur. Since the lever 472 is rocked clockwise by the operation of the error key it will be seen in FIG. 7 that the lever 474 will move counterclockwise and lever 451 will be moved to the left prior to the time that the shaft 225 starts to rotate. Since slides 413 and 416 will be elevated near the end of the rotation of cam 238 on shaft 225 both of the bellcrank levers 417 and 419 will be rocked clockwise to cause release of the pawls 372 and 378 associated with the punctuation control slides 312 and 313. However since the lever 451 is moved to the left by the operation of the error key the rearwardly extending lug 451A thereon will be moved to the left of the upper surface of pawl 378. Hence the clockwise movement of pawl 378 by the bellcrank lever 419 will not affect the pawl 375 which serves to couple slides 312 and 313. Therefore the springs 371 and 379 will be effective to pull slides 311, 312 and 313 to the right to bring slides 312 and 311 to their home positions. Since the pawl 375 remains engaged with the lugs 312D on slide 312 the slide 313 is prevented from moving to its rightmost position but instead will remain displaced to the left thereof by a number of steps equal to the digits to the right of the decimal in the previously entered multiplicand. Since the slide 313 is lighter than the combined weight of slides 311 and 312 the slide 313 during such operation tends to move more rapidly than slides 311 and 312 and therefore actually helps to drive slides 311 and 312. The spring 379 is preferably slightly stronger than spring 371 to make certain that the slides 311 and 312 do not move to the right more rapidly than the slide 313. In addition the surface of the bellcrank levers 417 and 419 is such that the pawl 378 is operated slightly ahead of the pawl 372 to further prevent movement of the slides 311 and 312 ahead of the slide 313.

From the above it will be seen that when the error key is operated to correct an error made during operation of the numerical keys for entry of a multiplier the slides 311 and 312 will be returned to their rightmost home positions. If the slide 313 had been previously moved to the left during the entry of a multiplicand such operation of the error key to remove an erroneously entered multiplier will cause the slides 311 and 312 to be restored but will allow the slide 313 to remain to the left of its home position by a number of steps equal to the digits to the right of the decimal in the correctly entered multiplicand. Thus the operator need only re-enter the correct multiplier, and during such entering operation the slides 312 and 313 will be stepped to the left by the proper number of places to position the slide 312 for printing of the multiplier and slide 313 for printing of the product. It should be noted that if an operator makes a mistake during the operation of the numerical keys for the entry of the first factors (such as a multiplicand) such error will be corrected by the subsequent operation of the error key since at that time the slides 312 and 313 will have been displaced to the left by equal amounts.

From the above it is seen that the desired punctuation marks are properly printed in the multiplicand, multiplier and product with the location of the marks being automatically determined by the operation of a decimal key. It should be noted that the stepped slide 401 returns to its FIG. 7 position when lever 406 is in the "monetary" position of FIG. 7. From FIG. 6 it will be seen that the add key 460 does not affect the levers 423 and 424 and therefore stepped slide 401 remains in its lowermost position when the key 460 is operated. Accordingly, monetary punctuation is automatically obtained without the need for an operator to depress the decimal key during the entry of monetary amounts. Furthermore, the apparatus disclosed enables an operator to correct erroneous entries with facility.

There has thus been disclosed a preferred embodiment of an improved decimal locating and printing mechanism for a calculating machine and in particular an improved printing mechanism which automatically causes the necessary punctuation marks to be printed in response to the operation of numerical and punctuation keys. Further variations and modifications which will be apparent to one skilled in the art are intended to be covered by the following claims.

What is claimed is:

1. A punctuation printing mechanism comprising in combination: a plurality of individually movable digit printing members, punctuation printing means disposed between two of said digit printing members, and means selectively coupling said punctuation printing means to one of said digit printing members to thereby print one punctuation sign and to the other of said digit printing members to thereby print another punctuation sign.

2. A punctuation printing mechanism as defined in claim 1 wherein said punctuation printing means is coupled with an adjacent higher order digit printing member for comma printing and with an adjacent lower order digit printing member for decimal printing.

3. A printing mechanism of the class described comprising in combination; a plurality of individually variably movable digit printing members; punctuation printing means disposed between two adjacent ones of said digit printing members for selectively printing a decimal or a comma; and coupling means responsive to the operation of the lower order one of said two digit printing members for causing said punctuation printing means to print a decimal and coupling means responsive to the operation of the higher order one of said two digit printing members for causing said punctuation printing means to print a comma.

4. A punctuation printing mechanism comprising in combination: a plurality of ordinally arranged individually variably movable digit printing members; a plurality of individually variably movable punctuation printing members each disposed between two adjacent ones of said digit printing members; first coupling means adapted to couple a punctuation printing member which is in a first position with an adjacent higher order digit printing member; second coupling means adapted to couple a punctuation printing member which is in a second position with an adjacent lower order digit printing member and selection means for maintaining a selected one of said punctuation printing members in a first position.

5. A printing mechanism comprising in combination: a plurality of individually variably movable digit printing devices; a plurality of individually variably movable punctuation printing elements disposed between adjacent ones of said devices, each of said elements having a decimal font and a comma font; selection means operable to move a selected one of said elements to its decimal printing position and each third higher order element to its comma printing position; and means responsive to a printing operation in the lower order device adjacent to the element moved to its decimal printing position for causing decimal printing to occur and responsive to a printing operation in the higher order device adjacent to an element moved to its comma printing position for causing a comma to print.

6. A punctuation printing mechanism comprising in combination: a plurality of digit printing means; a plurality of individually operable punctuation elements each having a decimal font and a comma font; selection means operable to selectively position said punctuation elements in a first position or a second position; and coupling means adapted to couple a digit printing means with an adjacent higher order punctuation printing element when said adjacent higher order punctuation element is in its said first position and to couple a digit printing means with an adjacent lower order punctuation printing element when said adjacent lower order punctuation element is in its said second position.

7. A punctuation printing mechanism comprising in combination: a plurality of ordinally arranged digit printing elements; a plurality of individually variably movable punctuation printing elements disposed between adjacent ones of said digit printing elements and each selectively movable to one or the other of two active positions; a plurality of first coupling means associated with each of said punctuation printing elements and an adjacent higher order digit printing element adapted to couple a punctuation printing element which is in a first position with an adjacent higher order digit printing element; a plurality of second coupling means associated with each of said punctuation printing elements and an adjacent lower order digit printing element adapted to couple a punctuation printing element which is in a second position with an adjacent lower order digit printing element; and selection means for moving a selected one of said punctuation elements to its said second position and each third higher order punctuation element to its said first position.

8. A punctuation printing mechanism comprising in combination: a plurality of individually variably movable digit printing members; a plurality of individually variably movable punctuation printing members disposed between adjacent ones of said digit printing members; a plurality of individually operable driving means each associated with one of said digit printng members and selectively operable to drive the associated digit printing member; a first lug extending in a first direction from each of said driving means adapted to engage one of said punctuation members when said one punctuation member is in a first position; and a second lug extending from each of said driving means in a second direction opposite to said first direction and adapted to engage a second one of said punctuation printing members when said second one is in a second position.

9. A punctuation printing mechanism comprising in combination: a plurality of normally disabled individually variably movable digit printing members; means for moving each of said members to a first enabled position and for urging each of said members toward said disabled position prior to a printing operation; a plurality of individually variably movable punctuation printing elements each having a decimal font and a comma font thereon; selection means operable to selectively move one of said punctuation printing elements from a home position to a first position to bring the comma font to printing position or to a second position to bring the decimal font to printing position; means responsive to an element being in its said second position for holding the adjacent lower order member in its first enabled position, and means responsive to said adjacent lower order member being held in its first enabled position for holding the adjacent higher order member in a second enabled position.

10. A punctuation control mechanism for a calculating machine having numerical keys and comprising in combination: first and second punctuation control members adapted to be moved in two directions selectively to enable the printing of punctuation marks between orders of amounts; means urging said members in a first direction toward a home position; means responsive to the operation of said numerical keys for moving said members in a second direction opposite to said first direction; means holding said members against movement in said first direction; first selectively operable means adapted to release only said first member for movement in said first direction; second selectively operable means adapted to release each of said members for movement in said first direction, and means preventing relative movement between said members when said second selectively operable means releases each of said members for movement in said first direction.

11. A punctuation control mechanism for an accounting machine having numerical keys and including first and second control slides, means urging said slides in a first direction, first pawl means holding said first slide against movement in said first direction, second pawl means holding said second slide against movement in said first direction, drive means responsive to the operation of said numerical keys for stepping said second slide in a second direction opposite to said first direction, third pawl means coupling said first slide with said second slide for movement with said second slide in said second direction, a first control key operative to disable said second pawl means, and a second control key operative to disable said first and second pawl means without affecting said third pawl means.

12. Punctuation control mechanism for an accounting machine comprising in combination: first and second punctuation locating members each having a home position; means selectively operable to move said members in a first direction away from their said home positions; a first operation control key; means responsive to the operation of said first key to restore said first member to its said home position; means holding said second member against movement toward its home position during movement of said first member to its home position in response to the operation of said first key; a second operation control key; means responsive to the operation of said second key to move said first member to its said home position, and means preventing relative movement between said members during movement of said first member to its home position in response to the operation of said second key.

13. A punctuation mechanism for an accounting machine comprising in combination: a plurality of numerical keys; first and second decimal locating slides; first and second latching means respectively associated with said slides and preventing movement thereof in a first direction; means responsive to the operation of said numerical keys adapted to move said slides in a second direction opposite to said first direction; third latching means associated with said slides operable to prevent movement of said second slide with respect to said first slide in said second direction and to permit movement of said second slide in said first direction with respect to said first slide; first control means operable to release said second latching means to permit movement of said second slide in said first direction with respect to said first slide, and second control means operable to release said first and second latching means to permit movement of said slides in said first direction without affecting said third latching means.

14. A punctuation mechanism for a calculating machine as defined in claim 13 and including: decimal printing means; means responsive to the operation of said first control means to position said decimal printing means at a position determined by said second slide, and third operation control means operable to position said decimal printing means at a position determined by said first slide and to disable each of said latching means.

15. A punctuation mechanism for an accounting machine comprising in combination: a plurality of ordinally arranged digit printing members; a plurality of individually movable punctuation printing elements disposed between adjacent ones of said members; a first control slide having a home position and including first punctuation locating means positioned to locate a decimal between the second and third orders of said digit printing members when said slide is in its home position; second and third control slides each having a home position and including second and third punctuation locating means respectively associated therewith and each positioned to locate a decimal to the right of the first order digit printing member when said second and third slides are in their home positions; punctuation printing element control means selectively operable by one of said punctuation locating means for positioning one of said elements in its decimal printing position; a plurality of numerical keys; and selectively operable means adapted to move said second and third slides away from their said home positions in response to the operation of said numerical keys.

16. A punctuation mechanism as defined in claim 15 and including first, second and third operation control devices, and means rendering said punctuation printing element control means responsive to the position of said first slide when said first device is operated, to the position of said second slide when said second device is operated, and to the position of said third slide when said third device is operated.

17. A punctuation printing mechanism for a calculating machine comprising in combination: a plurality of individually variably movable digit printing members; a plurality of individually variably movable punctuation printing members each having a decimal font and a comma font; first and second punctuation control slides each having a home position; sensing means selectively positionable over one of said slides and adapted to move a selected one of said punctuation printing members to its decimal printing position in accordance with the position of the selected slide; a plurality of numerical keys; a punctuation key; means controlled by said punctuation key for moving said slides in a first direction from their home positions in response to the operation of said numerical keys; first, second and third control keys; means operable to position said sensing means in alignment with said first slide in response to the operation of said first control key and to position said sensing means in alignment with said second slide in response to the operation of said second control key; and means operable to move said first slide to its home position in response to the operation of said first control key without affecting the position of said second slide and to move said first slide to its home position while preventing relative movement between said slides in response to the operation of said third control key.

18. A printing mechanism for an accounting machine comprising in combination: a plurality of ordinally arranged digit printing members; means for simultaneously moving each of said members from a first disabled position to a second enabled position and for urging each of said members back to its first position prior to a printing operation; means controlled by said digit keys for holding a member against return to its first position and for positioning a member in a selected numerical printing position; a plurality of punctuation printing members disposed between adjacent ones of said digit printing members; a punctuation key; selection means responsive to the operation of said digit keys following the operation of said punctuation key to select one of said punctuation members; means operable to move said selected one of said punctuation members to a first position and each third higher punctuation member to a second position; coupling means adapted to couple a punctuation member which is in its said first position with an adjacent lower order digit printing member and to couple a punctuation printing member which is in its said second position with an adjacent higher order digit printing member; means responsive to a punctuation member being in its said first position to hold the adjacent lower order digit printing member against return to its said first position; and means operable in response to a digit printing member being held in its said second enabled position or a numerical printing position for preventing the adjacent higher order digit printing member from returning to its said first position.

19. A punctuation mechanism for a calculating machine comprising in combination: a plurality of individually operable digit printing members; a plurality of individually movable punctuation printing elements disposed between said members, each of said elements being movable to a first position for comma printing and to a second position for decimal printing; coupling means adapted to couple an element which is in its said first position with an adjacent higher order digit printing member and to couple an element which is in its said second position with an adjacent lower order digit printing member; first and second control slides; control means responsive to the position of one or the other of said slides for moving one of said elements to its second position and each third higher order element to its first position; first, second and third operation control keys; means responsive to the operation of said first control key to render said control means responsive to the position of said first slide, means responsive to the operation of said second control key for rendering said control means responsive to the position of said second slide; a plurality of numerical keys; means responsive to the operation of said numerical keys to move said slides in a first direction; means operable by said first operation control key for moving said first slide in a second direction opposite to said first direction without affecting said second slide following a printing operation; means responsive to the operation of said second control key for moving said second slide in said second direction following a printing operation; means operable by said third control key to move said first slide in said second direction, and means preventing relative movement between said slides during movement of said first slide in said second direction in response to the operation of said third control key.

References Cited in the file of this patent

UNITED STATES PATENTS

| | | |
|---|---|---|
| 2,917,232 | Wagemann | Dec. 15, 1959 |
| 2,986,993 | Gang | June 6, 1961 |
| 2,987,246 | Wagemann | June 6, 1961 |
| 3,080,111 | Gelling | Mar. 5, 1963 |

FOREIGN PATENTS

| | | |
|---|---|---|
| 1,234,632 | France | May 16, 1960 |